United States Patent
Kawai et al.

(10) Patent No.: US 10,253,161 B2
(45) Date of Patent: *Apr. 9, 2019

(54) THERMOFORMED CONTAINER AND PRODUCTION METHOD THEREOF

(71) Applicant: KURARAY CO., LTD., Kurashiki-shi (JP)

(72) Inventors: Hiroshi Kawai, Kurashiki (JP); Shogo Nakazawa, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 451 days.

This patent is subject to a terminal disclaimer.

(21) Appl. No.: 15/023,238

(22) PCT Filed: Sep. 17, 2014

(86) PCT No.: PCT/JP2014/074590
§ 371 (c)(1),
(2) Date: Mar. 18, 2016

(87) PCT Pub. No.: WO2015/041258
PCT Pub. Date: Mar. 26, 2015

(65) Prior Publication Data
US 2016/0229987 A1    Aug. 11, 2016

(30) Foreign Application Priority Data

Sep. 20, 2013 (JP) .................... 2013-196249
Sep. 20, 2013 (JP) .................... 2013-196251
Sep. 20, 2013 (JP) .................... 2013-196252

(51) Int. Cl.
*C08K 5/098*    (2006.01)
*C08K 5/07*    (2006.01)
(Continued)

(52) U.S. Cl.
CPC ............... *C08K 5/098* (2013.01); *B65D 1/26* (2013.01); *C08K 5/07* (2013.01); *C08K 5/09* (2013.01)

(58) Field of Classification Search
CPC . C08K 5/07; C08K 5/09; C08K 5/098; B65D 1/26
(Continued)

(56) References Cited

U.S. PATENT DOCUMENTS 4,261,473 A    4/1981    Yamada et al.
5,342,662 A    8/1994    Aoyama et al.
(Continued)

FOREIGN PATENT DOCUMENTS

CN    101006130 A    7/2007
JP    52-141785 A    11/1977
(Continued)

OTHER PUBLICATIONS

International Search Report dated Oct. 21, 2014 in PCT/JP2014/074590.

*Primary Examiner* — William K Cheung
(74) *Attorney, Agent, or Firm* — Oblon, McClelland, Maier & Neustadt, L.L.P.

(57) ABSTRACT

Provided is a thermoformed container having a superior appearance as a result of inhibition of coloring and generation of defects during the melt molding, having sufficient strength, and further having a self-purge feature in a production process. The thermoformed container includes an EVOH layer (A) containing an ethylene-vinyl alcohol copolymer (I) as a principal component, wherein the EVOH layer (A) contains a carbonyl compound (II), the carbonyl compound (II) is an unsaturated aldehyde (II-1), a saturated aldehyde (II-2), a saturated ketone (II-3) or a combination thereof, and the content of the carbonyl compound (II) in the
(Continued)

EVOH layer (A) is 0.01 ppm or greater and 100 ppm or less. The carbonyl compound (II) is preferably an unsaturated aldehyde (II-1), and the unsaturated aldehyde (II-1) is preferably an unsaturated aliphatic aldehyde.

14 Claims, 5 Drawing Sheets

(51) Int. Cl.
*C08K 5/09* (2006.01)
*B65D 1/26* (2006.01)

(58) Field of Classification Search
USPC .......................................................... 524/6
See application file for complete search history.

(56) References Cited

U.S. PATENT DOCUMENTS

| | | | |
|---|---|---|---|
| 5,972,447 | A | 10/1999 | Hata et al. |
| 6,288,165 | B1 | 9/2001 | Moritani et al. |
| 2002/0176953 | A1 | 11/2002 | Tsai et al. |
| 2004/0204549 | A1 | 10/2004 | Yoshimi et al. |
| 2005/0032955 | A1 | 2/2005 | Nakano et al. |
| 2008/0003390 | A1 | 1/2008 | Hayashi et al. |

FOREIGN PATENT DOCUMENTS

| | | | |
|---|---|---|---|
| JP | 53-88067 A | | 8/1978 |
| JP | 59-20345 A | | 2/1984 |
| JP | 2-235952 A | | 9/1990 |
| JP | 11-140136 A | | 5/1999 |
| JP | 2001-146116 A | | 5/2001 |
| JP | 2001-206999 A | | 7/2001 |
| JP | 2002-69320 A | | 3/2002 |
| JP | 2004-35759 A | | 2/2004 |
| JP | 2004-526835 A | | 9/2004 |
| JP | 2005-41993 A | | 2/2005 |
| JP | 2007-031725 | * | 2/2007 |
| JP | 2007-31725 A | | 2/2007 |
| JP | 2009-242645 A | | 10/2009 |
| WO | WO 2005/014716 A1 | | 2/2005 |
| WO | WO 2005/105437 A1 | | 11/2005 |
| WO | WO 2006/022256 A1 | | 3/2006 |
| WO | WO 2011/125736 A1 | | 10/2011 |
| WO | WO 2012/060371 A1 | | 5/2012 |
| WO | WO 2013/146961 | | 10/2013 |
| WO | WO 2013/146962 A1 | | 10/2013 |

\* cited by examiner

THERMOFORMED CONTAINER AND PRODUCTION METHOD THEREOF

This application is a national stage of PCT International Application No. PCT/JP14/74590 filed in Japan on Sep. 17, 2014, which claims priority to and incorporates by reference the entire contents of Japanese Patent Application No. 2013-196249 filed in Japan on Sep. 20, 2013, Japanese Patent Application No. 2013-196251 filed in Japan on Sep. 20, 2013, and Japanese Patent Application No. 2013-196252 filed in Japan on Sep. 20, 2013.

TECHNICAL FIELD

The present invention relates to a thermoformed container and a production method thereof.

BACKGROUND ART

Ethylene-vinyl alcohol copolymers (hereinafter, may be abbreviated as "EVOH(s)") have been widely used as a material that is moldable through melting and superior in gas barrier properties. For example, EVOHs have been used as a material for films and sheets to be formed by melt molding. EVOH layers constituted with the sheets and the like have been used as a packaging material after being laminated on a thermoplastic resin layer containing an olefin-derived resin, etc. as a principal component. Such a packaging material having the EVOH layer may be subjected to thermoforming and thereafter utilized as a packaging container. Since the packaging container is superior in oxygen barrier properties due to including the EVOH layer, the packaging container has been widely used in intended usages in which superior oxygen barrier properties are demanded in a variety of fields of, for example, foods, cosmetics, medical drugs, chemicals, and toiletries.

However, the EVOH layer is generally inferior in thermoformability as compared with the thermoplastic resin layer containing the olefin-derived resin, etc. as a principal component. Thus, according to the packaging material including the EVOH layer, defects such as pinholes and cracks are likely to be generated during the thermoforming, and consequently the packaging container is likely to have an unfavorable appearance. Furthermore, the packaging material including the EVOH layer is likely to have unevenness in thickness after the thermoforming, and accordingly tends to cause drawbacks such as impairment of gas barrier properties and mechanical strength of a packaging container.

In order to overcome such drawbacks, addition of a plasticizer to a resin composition for forming a sheet and the like containing the EVOH as a principal component (see Japanese Unexamined Patent Application, Publication Nos. S53-088067 and S59-020345), blending of polyamide with such a resin composition (see Japanese Unexamined Patent Application, Publication No. S52-141785), and the like have been studied. However, all of these result in significant impairment of the gas barrier properties.

In addition, a production method of EVOH has been known in which crotonaldehyde is coexisted in addition to ethylene and vinyl acetate in a polymerization step to produce the EVOH (see Japanese Unexamined Patent Application, Publication No. 2007-31725). According to this production method, an adhesion of scales in the interior of a polymerization tank can be inhibited by the coexistence of crotonaldehyde during the polymerization. As a result, according to films of the EVOH produced by this production method, generation of fish eyes resulting from the scales detached and mixed into the polymer can be reportedly decreased.

However, crotonaldehyde added in the polymerization is partially consumed in the polymerization step and a saponification step. In addition, crotonaldehyde has a solubility in water of as high as 18.1 g/100 g (20° C.) (The MERCK INDEX 14th 2006). On the other hand, the production method of EVOH typically includes the step of washing with water away sodium acetate produced in the neutralization after the saponification. Thus, crotonaldehyde added in the polymerization is substantially completely eliminated in the washing step during the production of EVOH, and thus hardly remains in a product such as an EVOH film. Therefore, according to the production method described above, the effects of the addition of an unsaturated aldehyde, e.g., an improvement of thermal stability and properties for operation for a long time period (long-run workability) in the thermoforming, and the like are unknown.

PRIOR ART DOCUMENTS

Patent Documents

Patent Document 1: Japanese Unexamined Patent Application, Publication No. S53-088067
Patent Document 2: Japanese Unexamined Patent Application, Publication No. S59-020345
Patent Document 3: Japanese Unexamined Patent Application, Publication No. S52-141785
Patent Document 4: Japanese Unexamined Patent Application, Publication No. 2007-31725

SUMMARY OF THE INVENTION

Problems to be Solved by the Invention

An object of the present invention is to provide a thermoformed container having a superior appearance as a result of inhibition of coloring and generation of defects during the melt molding, and having sufficient strength. In addition, another object of the present invention is to provide a production method that enables a thermoformed container having the characteristics described above to be formed, and achieves superior long-run workability (viscosity stability).

Means for Solving the Problems

According to an aspect of the invention made for solving the aforementioned problems, a thermoformed container is provided which includes an EVOH layer (A) containing an ethylene-vinyl alcohol copolymer (I) as a principal component, wherein the EVOH layer (A) contains a carbonyl compound (II), wherein the carbonyl compound (II) is an unsaturated aldehyde (II-1), a saturated aldehyde (II-2), a saturated ketone (II-3) or a combination thereof, and the content of the carbonyl compound (II) in the EVOH layer (A) is 0.01 ppm or greater and 100 ppm or less.

The thermoformed container according to the aspect of the present invention includes the EVOH layer (A) having the content of the carbonyl compound (II) falling within the specified range. The EVOH layer (A) is formed by, for example, subjecting to melt molding, a resin composition containing the EVOH as a principal component and containing the specified amount of the carbonyl compound (II). In the melt molding, due to containing the specified amount of the carbonyl compound (II), the resin composition can inhibit coloring, generation of defects such as gelation (dirt under paint) and streaks, and generation of fine pinholes and cracks, although the action of the carbonyl compound (II) has not been clarified. As a result, the EVOH layer (A) obtained from the resin composition, and, in turn, the thermoformed container that includes the EVOH layer (A) have a superior appearance and sufficient strength. In addition, since the EVOH layer (A) contains the specified amount of the carbonyl compound (II), a superior self-purge feature in the production process of the thermoformed container is achieved, and consequently the production cost of the thermoformed container can be reduced.

It is to be noted that although the action of the carbonyl compound (II) for inhibiting the coloring and the generation of the defects such as streaks in the melt-molded article (e.g., a film for the EVOH layer (A)) produced using the resin composition is not necessarily clarified, it is inferred that oxidative degradation of the EVOH (I) in the melt molding would be prevented as a result of the oxidization of the carbonyl compound (II). Due to such an effect of the prevention of the oxidization of the EVOH (I), the generation of thermal deterioration products such as gelation would be inhibited.

The unsaturated aldehyde (II-1) is preferably an unsaturated aliphatic aldehyde. The unsaturated aliphatic aldehyde is preferably crotonaldehyde, 2,4-hexadienal, 2,4,6-octatrienal or a combination thereof. The saturated aldehyde (II-2) is preferably propanal, butanal, hexanal or a combination thereof. The saturated ketone (II-3) is preferably acetone, methyl ethyl ketone, 2-hexanone or a combination thereof. When the EVOH layer (A) contains any of the substances specified above as the carbonyl compound (II), the thermoformed container has a more superior appearance and has sufficient strength.

It is preferred that the EVOH layer (A) further contains a conjugated polyene compound (III). The content of the conjugated polyene compound (III) in the EVOH layer (A) is preferably 0.01 ppm or greater and 1,000 ppm or less. When the EVOH layer (A) further contains the specified amount of the conjugated polyene compound (III), the oxidative degradation of the EVOH layer (A) in the melt molding is inhibited by the conjugated polyene compound (III), and consequently the coloring, the generation of defects such as gelation, and the like are further reduced, leading to a more improved appearance. Therefore, when the thermoformed container includes the EVOH layer (A) further containing the specified amount of the conjugated polyene compound (III), the generation of the defects is further reduced, leading to a more improved appearance. Moreover, since a more superior self-purge feature in the formation of the EVOH layer (A) by melt molding is also achieved, the production cost of the thermoformed container can be further reduced.

The conjugated polyene compound (III) is preferably sorbic acid, a sorbic acid salt or a combination thereof. According to the EVOH layer (A) further containing sorbic acid or the like as the conjugated polyene compound (III), the oxidative degradation of the EVOH layer (A) in the melt molding is effectively inhibited by sorbic acid or the like, and consequently the coloring, the generation of the defects such as gelation, and the like are further reduced, leading to a more improved appearance. Therefore, when the thermoformed container includes the EVOH layer (A) further containing the specified amount of the conjugated polyene compound (III), the generation of the defects is further reduced, leading to a more improved appearance. Moreover, since a further superior self-purge feature in the formation of the EVOH layer (A) by melt molding is achieved, the production cost of the thermoformed container can be further reduced.

It is preferred that the thermoformed container further includes thermoplastic resin layers (B) each laminated on one face side and the other face side of the EVOH layer (A), and a polyolefin layer (C) containing a carboxylic acid-modified polyolefin as a principal component and arranged between the EVOH layer (A) and the thermoplastic resin layer (B). The solubility parameter (SP value) of the thermoplastic resin constituting the thermoplastic resin layer (B), calculated using the Fedors equation, is preferably 11 $(cal/cm^3)^{1/2}$ or less. When the thermoplastic resin layer (B) having such an SP value and the polyolefin layer (C) are further included, gas barrier properties, oil resistance, impact resistance and the like of the thermoformed container under high humidity can be improved.

The thermoformed container is preferably a cup shape container or a tray shape container. In other words, the thermoformed container can be suitably used for cup-shaped containers or tray-shaped containers for which favorable gas barrier properties are demanded, and also exhibits a superior appearance characteristics.

According to another aspect of the present invention, a method for producing a thermoformed container includes the steps of: forming an EVOH layer (A) using a resin composition containing an ethylene-vinyl alcohol copolymer (I) as a principal component and containing the carbonyl compound (II); and subjecting a layer including the EVOH layer (A) to thermoforming, wherein the content of the carbonyl compound (II) in the resin composition is 0.01 ppm or greater and 100 ppm or less.

According to the method for producing a thermoformed container, coloring as well as generation of defects such as gelation and streaks during the formation of the EVOH layer (A) can be inhibited, and additionally the EVOH layer (A) containing the specified amount of the carbonyl compound (II) can be obtained. Thus, the thermoformed container obtained according to the production method has a superior appearance and sufficient strength. Moreover, since the resin composition and the EVOH layer (A) contain the specified amount of the carbonyl compound (II), a superior self-purge feature is achieved in the production process of the thermoformed container, leading to a cost reduction. In addition, since the resin composition containing the specified amount of the carbonyl compound (II) is used in the production method, the oxidization of the EVOH is prevented, and superior long-run workability (viscosity stability) is exhibited.

The "principal component" as referred to herein means a component included at the greatest content, and for example, a component included at a content of 50% by mass or greater. As used herein, "ppm" as referred to means a mass proportion of a pertinent component in the layer constituting the thermoformed container, and 1 ppm means 0.0001% by mass. The "solubility parameter calculated using the Fedors equation" as referred to means an SP value calculated using the following formula:

$$SP\ value(\delta) = (E/V)^{1/2}$$

wherein E represents a molecular cohesive energy (cal/mol), and is obtained as the sum of the evaporation energies of the atoms or atomic groups constituting a compound, and V represents a molecular volume ($cm^3$/mol), and is obtained as the sum of the molar volumes of the atoms or atomic groups constituting the compound.

Effects of the Invention

The thermoformed container according to the aspect of the present invention exhibits superior appearance characteristics since the coloring and the generation of defects such as gelation and streaks which are caused on melt molding are inhibited due to the EVOH layer (A) containing the specified amount of the carbonyl compound (II). Additionally, the thermoformed container has sufficient strength. Furthermore, according to the thermoformed container, since the EVOH layer (A) contains the specified amount of the carbonyl compound (II), a superior self-purge feature in a production process is also achieved, whereby the production cost of the thermoformed container can be reduced. Thus, the thermoformed container can be used in a variety of intended usages. According to the production method of the another aspect of the present invention, the oxidization of the EVOH is inhibited, and superior long-run workability (viscosity stability) is exhibited since the resin composition containing the specified amount of the carbonyl compound (II) is used.

DESCRIPTION OF EMBODIMENTS

Figure 1:
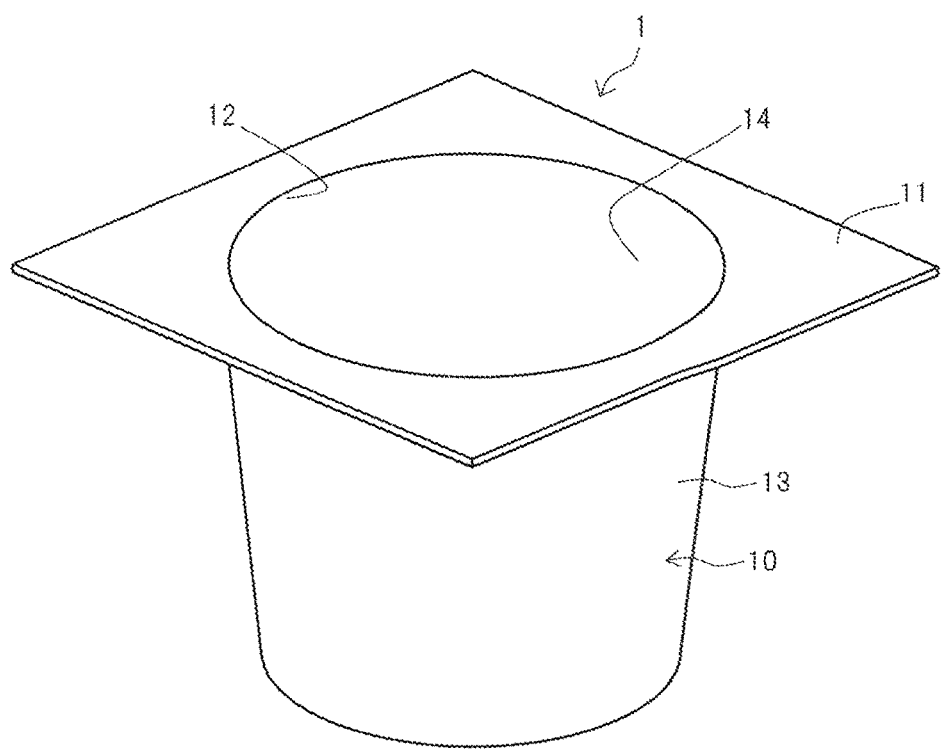
FIG. 1 shows a schematic perspective view illustrating a cup-shaped container which is an embodiment of the thermoformed container according to the present invention.

Hereinafter, embodiments of the thermoformed container and the production method thereof of the present invention will be described. However, the present invention is not limited to the embodiments described in the following.

Thermoformed Container

The thermoformed container according to an embodiment of the present invention can be used in intended usages in which superior oxygen barrier properties are demanded in a variety of fields of, for example, foods, cosmetics, medical drugs, chemicals, and toiletries. The thermoformed container is formed to give a container having a retaining portion by, for example, subjecting a multilayer structure to thermoforming.

Retaining Portion

The retaining portion is for retaining contents such as foods. The shape of the retaining portion is decided in accordance with the shape of the contents. Specifically, the thermoformed container is formed to give, for example, a cup-shaped container, a tray-shaped container, a bag-shaped container, a bottle-shaped container, a pouch-shaped container, and the like.

The specification of the retaining portion may be expressed by a draw ratio (S) as one indicator. The draw ratio (S) as referred to herein means a value obtained by dividing the depth of the bottom of the container by the diameter of an inscribed circle having the maximum diameter in the opening of the container. Thus, a greater value of the draw ratio (S) indicates a deeper container, whereas a smaller value of the draw ratio (S) indicates a shallower container. For example, in the case of the thermoformed container having a cup shape, the draw ratio (S) thereof would be larger, whereas in the case of the thermoformed container being a tray, the draw ratio (S) thereof would be smaller. It is to be noted that the value of the diameter of an inscribed circle having the maximum diameter corresponds to, for example: a diameter of a circular shape when the opening of the retaining portion is circular; a shortest diameter (minor axis) of an elliptical shape when the opening of the retaining portion is elliptical; and a length of the shorter side of a rectangular shape when the opening of the retaining portion is rectangular.

A suitable draw ratio (S) varies in accordance with whether the multilayer structure used for forming the thermoformed container is a film or a sheet, in other words, the thickness of the multilayer structure. In a case where the thermoformed container is formed by the thermoforming of a film, the draw ratio (S) thereof is preferably 0.2 or greater, more preferably 0.3 or greater, and still more preferably 0.4 or greater. On the other hand, when the thermoformed container is obtained by forming of a sheet, the draw ratio (S) thereof is preferably 0.3 or greater, more preferably 0.5 or greater, and still more preferably 0.8 or greater. It is to be noted that the film as referred to means a soft substance having a thickness of less than 0.2 mm, and the sheet as referred to means a soft substance having a greater thickness than that of the film, for example, a thickness of 0.2 mm or greater.

Multilayer Structure

The multilayer structure includes the EVOH layer (A) that contains an ethylene-vinyl alcohol copolymer as a principal component, and other layer(s) laminated on at least one of one face side and the other face side of the EVOH layer (A). The term "one face side" as referred to herein means the inner surface side of the retaining portion of the thermoformed container formed from the multilayer structure, and the term "the other face" as referred to herein means the outer surface side of the retaining portion. The multilayer structure may be in the form of a film, or in the form of a sheet.

The lower limit of the thickness ratio (I/O) of the total thickness (I) of the other layer(s) laminated on the one face side of EVOH layer (A) to the total thickness (O) of the other layer(s) laminated on the other face side of the EVOH layer (A) is preferably 1/99, and more preferably 30/70. Moreover, the upper limit of the ratio I/O is preferably 70/30, and more preferably 55/45. It is to be noted that the thickness of the entire layer or a single layer of the multilayer structure is an average value of the thicknesses measured by optical microscopic inspection of samples obtained from a plurality of portions of the multilayer structure by cutting away with a microtome, and that the thickness of the entire layer or a single layer of the multilayer structure is substantially the same as the thickness of the entire layer or a single layer of the thermoformed container.

The lower limit of the overall average thickness of the thermoformed container is preferably 300 μm, more preferably 500 μm, and still more preferably 700 μm. Moreover, the upper limit of the overall average thickness of the thermoformed container is preferably 10,000 μm, more preferably 8,500 μm, and still more preferably 7,000 μm. It is to be noted that the overall average thickness as referred to means the thickness of the entire layer in the retaining portion of the thermoformed container, and the measuring method thereof is similar to that for the measurement of the thickness of the entire layer of the multilayer structure. When the overall average thickness is greater than the upper limit, a production cost of the thermoformed container may increase. On the other hand, when the overall average thickness is less than the lower limit, the rigidity of the thermoformed container may not be maintained, leading to easy breakage of the thermoformed container. Therefore, it is important to select the overall average thickness of the thermoformed container in accordance with the volume and intended usages thereof.

The other layers which may be laminated on the EVOH layer (A) are exemplified by a thermoplastic resin layer (B), a polyolefin layer (C), a recovery layer (D), and the like. Hereinafter, the EVOH layer (A), the thermoplastic resin layer (B), the polyolefin layer (C) and the recovery layer (D) will be described in more detail.

EVOH Layer (A)

The EVOH layer (A) contains the EVOH (I) as a principal component, and contains the carbonyl compound (II). The EVOH layer (A) preferably further contains the conjugated polyene compound (III), and may contain other optional component within a range not leading to impairment of the effects of the present invention. Hereinafter, each component is explained in detail.

EVOH (I)

The EVOH (I) is a copolymer obtained by saponifying a copolymer of ethylene and a vinyl ester. The vinyl ester is exemplified by vinyl acetate, vinyl propionate, vinyl pivalate and the like, and vinyl acetate is preferred. These vinyl esters may be used either alone, or two or more types thereof may be used in combination.

The EVOH (I) may have other structural unit derived from a monomer other than ethylene and the vinyl ester. The monomer is exemplified by a vinylsilane compound and other polymerizable compound. The lower limit of the content of the other structural unit is preferably 0.0002 mol % with respect to the total structural units of the EVOH (I). Moreover, the upper limit of the content of the other structural unit is preferably 0.2 mol % with respect to the total structural units of the EVOH (I).

Examples of the vinylsilane compound include vinyltrimethoxysilane, vinyltriethoxysilane, vinyltri(β-methoxyethoxy)silane, γ-methacryloxypropylmethoxysilane, and the like. Of these, vinyltrimethoxysilane and vinyltriethoxysilane are preferred.

Examples of the other polymerizable compound include:
unsaturated hydrocarbons such as propylene and butylene;
unsaturated carboxylic acids or esters thereof such as (meth)acrylic acid, methyl (meth)acrylate and ethyl (meth)acrylate;
vinylpyrrolidones such as N-vinylpyrrolidone; and the like.

The lower limit of the ethylene content of the EVOH (I) is typically 20 mol %, preferably 24 mol %, and more preferably 27 mol %. Moreover, the upper limit of the ethylene content of the EVOH (I) is typically 60 mol %, preferably 55 mol %, more preferably 45 mol %, still more preferably 42 mol %, and particularly preferably 38 mol %. When the ethylene content is less than the lower limit, thermal stability in the melt extrusion may be deteriorated, leading to ease of gelation, and consequently defects such as streaks and fish eyes are likely to be generated. In particular, when an operation is made for a long time period under conditions involving a higher temperature or a higher speed than those for general melt extrusion, the gelation is highly likely to occur. On the other hand, when the ethylene content is greater than the upper limit, the gas barrier properties and the like may be deteriorated, and the advantageous characteristics of the EVOH (I) may not be sufficiently exhibited.

The degree of saponification of the structural units derived from the vinyl ester in the EVOH (I) is typically 85% or greater, preferably 90% or greater, more preferably 98% or greater, and still more preferably 99% or greater. When the degree of saponification is less than 85%, insufficient thermal stability may be caused.

The lower limit of the content of the EVOH (I) in the EVOH layer (A) is typically 95% by mass, preferably 98% by mass, more preferably 99% by mass, and still more preferably 99.5% by mass. When the content of the EVOH (I) is equal to or greater than the lower limit, the advantageous characteristics of the EVOH (I) can be sufficiently exhibited, and accordingly the EVOH layer (A) is more superior in gas barrier properties, oil resistance, and the like.

Carbonyl Compound (II)

The carbonyl compound (II) is an essential component of the EVOH layer (A) of the thermoformed container. According to the thermoformed container, when the thermoformed container includes the EVOH layer (A) containing the carbonyl compound (II), the generation of the defects such as gelation and streaks caused on melt molding can be inhibited, leading to superior appearance characteristics. In addition, since the EVOH layer (A) contains the specified amount of the carbonyl compound (II), the production cost can be reduced owing to a superior self-purge feature achieved in the production process of the thermoformed container.

The carbonyl compound (II) is an unsaturated aldehyde (II-1), a saturated aldehyde (II-2), a saturated ketone (II-3) or a combination thereof.

The unsaturated aldehyde (II-1) as referred to means an aldehyde that has a carbon-carbon double bond or a carbon-carbon triple bond in a molecule thereof. Examples of the unsaturated aldehyde (II-1) include unsaturated aliphatic aldehydes, for example:
aldehydes having a carbon-carbon double bond in a molecule thereof, such as acrolein, crotonaldehyde, methacrolein, 2-methylbutenal, 2-hexenal, 2,6-nonadienal, 2,4-hexadienal, 2,4,6-octatrienal, 5-methyl-2-hexenal, cyclopentenylaldehyde and cyclohexenylaldehyde;
aldehydes having a carbon-carbon triple bond in a molecule thereof, such as propiolaldehyde, 2-butyn-1-al and 2-pentyn-1-al; and the like.

Of these, the unsaturated aldehyde (II-1) is preferably an unsaturated aliphatic aldehyde, more preferably an aldehyde having a carbon-carbon double bond in a molecule thereof, and still more preferably crotonaldehyde, 2,4-hexadienal, 2,4,6-octatrienal or a combination thereof. Among these, crotonaldehyde having a boiling point of about 100° C. and having a high solubility in water is particularly preferred because of ease in eliminating an excess, or supplying a shortage as needed in a washing step and/or a drying step, for example. The unsaturated aldehyde (II-1) has preferably 3 to 10 carbon atoms, more preferably 4 to 8 carbon atoms, and still more preferably 4, 6 or 8 carbon atoms, including the carbon atom of the aldehyde moiety.

The saturated aldehyde (II-2) as referred to means an aldehyde that does not include an unsaturated bond in a moiety other than the aldehyde group in a molecule thereof. The saturated aldehyde (II-2) may be a linear aldehyde, a branched aldehyde, or an aldehyde having a ring structure in its molecule as long as the saturated aldehyde (II-2) does not include an unsaturated bond in the moiety other than the aldehyde group. The saturated aldehyde (II-2) may have one, or two or more aldehyde groups in a molecule thereof.

The saturated aldehyde (II-2) is exemplified by a saturated aliphatic aldehyde and the like. Examples of the saturated aliphatic aldehyde include propanal, butanal, pentanal, hexanal, heptanal, octanal, cyclohexanecarbaldehyde, cyclopentanecarbaldehyde, dimethylcyclohexanecarbaldehyde, methylcyclohexanecarbaldehyde, methylcyclopentanecarbaldehyde, and the like.

The lower limit of the number of carbon atoms of the saturated aldehyde (II-2) is preferably 3 in light of an improvement of the solubility of the saturated aldehyde (II-2) in water. Moreover, the upper limit of the number of carbon atoms of the saturated aldehyde (II-2) is preferably 50, more preferably 15, and still more preferably 8 in light of an improvement of the solubility of the saturated aldehyde (II-2) in water. In light of the inhibition of the generation of the defects, the saturated aldehyde (II-2) is preferably the saturated aliphatic aldehyde, more preferably propanal, butanal, hexanal or a combination thereof, and still more preferably propanal, among the saturated aldehydes exemplified.

The saturated ketone (II-3) as referred to means a ketone that does not include an unsaturated bond in a moiety other than the carbonyl group in a molecule thereof. The saturated ketone (II-3) may be a linear ketone, a branched ketone, or a ketone having a ring structure in a molecule thereof as long as the saturated ketone (II-3) does not include an unsaturated bond in the moiety other than the carbonyl group. The saturated ketone (II-3) may have one, or two or more carbonyl groups in a molecule thereof.

The saturated ketone (II-3) is exemplified by a saturated aliphatic ketone, a saturated cyclic ketone, and the like. Examples of the saturated aliphatic ketone include acetone, methyl ethyl ketone, 2-pentanone, 3-pentanone, 3-methyl-2-butanone, 2-hexanone, 3-hexanone, 4-methyl-2-pentanone, 2-methyl-3-pentanone, 3,3-dimethyl-2-butanone, 2-heptanone, 3-heptanone, 4-heptanone, 4-methyl-2-hexanone, 5-methyl-2-hexanone, 2,4-dimethyl-3-pentanone, 2-octanone, 3-methyl-2-heptanone, 5-methyl-3-heptanone, 3-octanone, 6-methyl-2-heptanone, 2,6-dimethyl-4-heptanone, methyl cyclopentyl ketone, methyl cyclohexyl ketone, ethyl cyclopentyl ketone, ethyl cyclohexyl ketone, and the like. Examples of the saturated cyclic ketone include cyclobutanone, cyclopentanone, cyclohexanone, cycloheptanone, cyclooctanone, and the like.

The lower limit of the number of carbon atoms of the saturated ketone (II-3) is preferably 3 in light of an improvement of the solubility of the saturated ketone (II-3) in water. Moreover, the upper limit of the number of carbon atoms of the saturated ketone (II-3) is preferably 50, more preferably 15, and still more preferably 8. In light of the inhibition of the generation of the defects, the saturated ketone (II-3) is preferably the saturated aliphatic ketone, more preferably acetone, methyl ethyl ketone, 2-hexanone or a combination thereof, and still more preferably acetone, among the saturated ketones exemplified.

A part or all of hydrogen atoms included in the carbonyl compound (II) (except for the hydrogen atom of the aldehyde group of the unsaturated aldehyde (II-1) and the saturated aldehyde (II-2)) may be substituted with a substituent within a range not leading to impairment of the effects of the present invention. The substituent is exemplified by a halogen atom, a hydroxy group, an amino group, an amide group, a cyano group, and the like.

The lower limit of the content of the carbonyl compound (II) in the EVOH layer (A) is 0.01 ppm, preferably 0.05 ppm, and more preferably 0.1 ppm. On the other hand, the upper limit of the content of the carbonyl compound (II) is 100 ppm, and preferably 50 ppm. When the content of the carbonyl compound (II) is less than the lower limit, the inhibition of a time-dependent increase of the occurrence of the gelation in melt molding may be insufficient. On the other hand, when the content of the carbonyl compound (II) is greater than the upper limit, the condensation of molecules of the carbonyl compound (II) as well as the crosslinking of an EVOH molecule with a condensate molecule of the molecules of the carbonyl compound (II) may occur during melt molding. Consequently, the generation of the fish eyes and the streaks may be induced, and the coloring of the EVOH layer (A) is also likely to occur.

Conjugated Polyene Compound (III)

The conjugated polyene compound (III) inhibits oxidative degradation in melt molding. The conjugated polyene compound (III) as referred to herein means a compound having a conjugated double bond, as generally referred to, i.e., having two or more carbon-carbon double bonds and having a structure in which a carbon-carbon double bond and a carbon-carbon single bond are alternately connected. The conjugated polyene compound (III) may be a conjugated diene including two double bonds involved in the conjugation, a conjugated triene including three double bonds involved in the conjugation, or a conjugated polyene including four or more double bonds involved in the conjugation. In addition, the conjugated double bond may be present in a plurality of number in a single molecule without being conjugated with one another. For example, compounds having three conjugated triene structures in a single molecule, such as tung oil, may also be included in the conjugated polyene compound (III). The upper limit of the number of conjugated double bonds in the conjugated polyene compound (III) is preferably 7. When the resin composition contains a conjugated polyene compound (III) having 8 or more conjugated double bonds, the coloring of the multilayer structure, and, in turn, the thermoformed container is highly likely to occur.

The conjugated polyene compound (III) may have, in addition to the conjugated double bond, other functional group such as a carboxyl group and a salt thereof, a hydroxyl group, an ester group, an ether group, an amino group, an imino group, an amide group, a cyano group, a diazo group, a nitro group, a sulfone group and a salt thereof, a sulfonyl group, a sulfoxide group, a sulfide group, a thiol group, a phosphoric acid group and a salt thereof, a phenyl group, a halogen atom, a double bond and a triple bond.

The lower limit of the number of carbon atoms of the conjugated polyene compound (III) is preferably 4. Moreover, the upper limit of the number of carbon atoms of the conjugated polyene compound (III) is preferably 30, and more preferably 10. The conjugated polyene compound (III) is preferably sorbic acid, a sorbic acid ester, a sorbic acid salt, myrcene or a mixture of two or more of these, and more preferably sorbic acid, a sorbic acid salt (sodium sorbate, potassium sorbate, and the like) or a mixture thereof. Sorbic acid, the sorbic acid salt and a mixture thereof exhibit superior inhibitory effects on oxidative degradation at high temperatures, and are preferred also in light of hygienic properties and availability since they are industrially used broadly also as food additives.

The molecular weight of the conjugated polyene compound (III) is typically 1,000 or less, preferably 500 or less, and more preferably 300 or less. When the molecular weight of the conjugated polyene compound (III) is greater than the upper limit, the state of dispersion of the conjugated polyene compound (III) in the EVOH (A) may be inferior, and the appearance after the melt molding may be unfavorable.

The lower limit of the content of the conjugated polyene compound (III) in the EVOH layer (A) is preferably 0.01 ppm, more preferably 0.1 ppm, still more preferably 0.5 ppm, and particularly preferably 1 ppm. Moreover, the upper limit of the content of the conjugated polyene compound (III) in the EVOH layer (A) is preferably 1,000 ppm, more preferably 800 ppm, and still more preferably 500 ppm. When the content of the conjugated polyene compound (III) is less than the lower limit, the inhibitory effects on oxidative degradation in the melt molding may not be sufficiently exhibited. On the other hand, when the content of the conjugated polyene compound (III) is greater than the upper limit, the gelation of the resin composition for forming the EVOH layer (A) may be facilitated.

Other Optional Component

The EVOH layer (A) may contain as other optional component, a boron compound, an acetic acid compound, a phosphorus compound, an alkali metal or a salt thereof, an antioxidant, an UV absorbent, a plasticizer, an antistatic agent, a lubricant, a colorant, a filler, a heat stabilizer, other resin, a metal salt of a higher aliphatic carboxylic acid, or the like. The EVOH layer (A) may contain two or more types of these components. The upper limit of the total content of these components in the EVOH layer (A) is preferably 1% by mass.

The boron compound inhibits gelation in the melt molding, and additionally inhibits a torque fluctuation of an extrusion molding machine or the like, i.e., a variation of a viscosity during heating. Examples of the boron compound include: boric acids such as orthoboric acid, metaboric acid and tetraboric acid; boric acid esters such as triethyl borate and trimethyl borate; boric acid salts such as alkali metal salts and alkaline earth metal salts of the aforementioned boric acids, and borax; boron hydrides; and the like. Of these, the boric acids are preferred, and orthoboric acid (hereinafter, may be also referred to as "boric acid") is more preferred. The lower limit of the content of the boron compound in the EVOH layer (A) is preferably 100 ppm, and more preferably 150 ppm. Moreover, the upper limit of the content of the boron compound in the EVOH layer (A) is preferably 5,000 ppm, more preferably 4,000 ppm, and still more preferably 3,000 ppm. When the content of the boron compound is less than the lower limit, a torque fluctuation of an extrusion molding machine or the like may not be sufficiently inhibited. On the other hand, when the content of the boron compound is greater than the upper limit, gelation is likely to occur during the melt molding, and consequently the appearance of the multilayer structure and, in turn, the thermoformed container may be deteriorated. It is to be noted that the content of the boron compound means the content of the boron compound in a dry resin composition in terms of boron element equivalent.

The acetic acid compound prevents the coloring of the multilayer structure, and, in turn, the thermoformed container, and additionally inhibits gelation during melt molding. The acetic acid compound includes acetic acid and an acetic acid salt. As the acetic acid compound, acetic acid and an acetic acid salt are preferably used in combination, and acetic acid and sodium acetate are more preferably used in combination. The lower limit of the content of the acetic acid compound in the EVOH layer (A) is preferably 50 ppm, more preferably 100 ppm, still more preferably 150 ppm, and particularly preferably 200 ppm. Moreover, the upper limit of the content of the acetic acid compound in the EVOH layer (A) is preferably 1,000 ppm, more preferably 500 ppm, and still more preferably 400 ppm. When the content of the acetic acid compound is less than the lower limit, sufficient coloring preventive effects may not be achieved, and consequently yellowing of the multilayer structure and, in turn, the thermoformed container may occur. On the other hand, when the content of the acetic acid compound is greater than the upper limit, gelation is likely to occur in the melt molding, in particular, in melt molding over a long time period, and consequently the appearance of the multilayer structure and, in turn, the thermoformed container may be deteriorated.

The phosphorus compound inhibits the coloring and the generation of defects such as streaks and fish eyes, and additionally improves the long-run workability. Examples of the phosphorus compound include phosphoric acid, phosphorous acid, phosphates, and the like. The phosphate may be in any form of a monobasic phosphate salt, a dibasic phosphate salt and a tribasic phosphate salt. In addition, the cationic species contained in the phosphate is not particularly limited, and alkali metal salts and alkaline earth metal salts are preferred. Of these, sodium dihydrogen phosphate, potassium dihydrogen phosphate, disodium hydrogen phosphate and dipotassium hydrogen phosphate are more preferred, and sodium dihydrogen phosphate and dipotassium hydrogen phosphate are still more preferred. The lower limit of the content of the phosphorus compound in the EVOH layer (A) is preferably 1 ppm, more preferably 2 ppm, still more preferably 3 ppm, and particularly preferably 5 ppm. The upper limit of the content of the phosphorus compound in the EVOH layer (A) is preferably 200 ppm, more preferably 150 ppm, and still more preferably 100 ppm. When the content of the phosphorus compound is less than the lower limit, or when the content of the phosphorus compound is greater than the upper limit, the thermal stability may be deteriorated, and the coloring and the occurrence of gelation are likely to occur in the melt molding over a long time period.

Examples of the alkali metal include lithium, sodium, potassium, and the like. Moreover, examples of the alkali metal salt include aliphatic carboxylic acid salts, aromatic carboxylic acid salts, metal complexes and the like of a monovalent metal, and specific examples thereof include potassium acetate, ethylenediaminetetraacetic acid sodium salt, and the like. The lower limit of the content of the alkali metal in the EVOH layer (A) is preferably 20 ppm, and more preferably 50 ppm. Moreover, the upper limit of the content of the alkali metal in the EVOH layer (A) is preferably 1,000 ppm, and more preferably 500 ppm.

Examples of the antioxidant include 2,5-di-t-butylhydroquinone, 2,6-di-t-butyl-p-cresol, 4,4'-thiobis(6-t-butylphenol), 2,2'-methylene-bis(4-methyl-6-t-butylphenol), octadecyl 3-(3',5'-di-t-butyl-4'-hydroxyphenyl)propionate, and the like.

Examples of the UV absorbent include ethylene 2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, and the like.

Examples of the plasticizer include dimethyl phthalate, diethyl phthalate, dioctyl phthalate, waxes, liquid paraffins, phosphoric acid esters, and the like.

Examples of the antistatic agent include pentaerythritol monostearate, sorbitan monopalmitate, sulfated polyolefins, polyethylene oxide, polyethylene glycol (trade name: Carbowax), and the like.

Examples of the lubricant include ethylene bisstearamide, butyl stearate, and the like.

Examples of the colorant include carbon black, phthalocyanine, quinacridone, indoline, azo pigments, colcothar, and the like.

Examples of the filler include glass fibers, wollastonite, calcium silicate, talc, montmorillonite, and the like.

Examples of the heat stabilizer include hindered phenol compounds, hindered amine compounds, and the like.

Examples of the other resin include polyamides, polyolefins, and the like.

Examples of the metal salt of the higher aliphatic carboxylic acid include sodium stearate, potassium stearate, calcium stearate, magnesium stearate, and the like.

It is to be noted that in order to inhibit the gelation, for example, the hindered phenol compound or the hindered amine compound, which are exemplified as the heat stabilizer, the metal salt of the higher aliphatic carboxylic acid, a hydrotalcite compound or the like may be added. These may be used either alone, or two or more types thereof may be used in combination. The lower limit of the amount of the compound added to inhibit the gelation is typically 0.01% by mass with respect to the EVOH layer (A). Moreover, the upper limit of the amount of the compound added to inhibit the gelation is typically 1% by mass with respect to the EVOH layer (A).

The lower limit of the ratio of average thickness of the EVOH layer (A) with respect to the overall average thickness, which will be described later in more detail, is not particularly limited; the average thickness of the EVOH layer (A) is preferably 0.02%, more preferably 0.5%, still more preferably 1.0%, and particularly preferably 1.5% in light of the barrier properties, the mechanical strength and the like. Moreover, the upper limit of the average thickness of the EVOH layer (A) is not particularly limited; the upper limit of the average thickness of the EVOH layer (A) with respect to the overall average thickness is preferably 34%, more preferably 5%, and still more preferably 4.5% in light of the barrier properties, the mechanical strength and the like. The lower limit of the average thickness of the EVOH layer (A) is 2 µm, for example. Moreover, the upper limit of the average thickness of the EVOH layer (A) is 100 µm, for example.

Production Method of EVOH Layer (A)

The EVOH layer (A) can be formed by subjecting to extrusion-molding, for example, the EVOH-containing resin composition that contains the EVOH (I) and the carbonyl compound (II).

Preparation Method of EVOH-Containing Resin Composition

The production method of the EVOH-containing resin composition is not particularly limited as long as the carbonyl compound (II) can be homogeneously blended in the EVOH (I), and additionally the carbonyl compound (II) can be contained in EVOH layer (A) in an amount of 0.01 ppm or greater and 100 ppm or less. The preparation method of the EVOH-containing resin composition (hereinafter, may be also referred to as "resin composition") is exemplified by a production method including the steps of:

(1) copolymerizing ethylene with a vinyl ester; and
(2) saponifying the copolymer obtained in the step (1).

The procedure for incorporating the specified amount of the carbonyl compound (II) into the resin composition is not particularly limited, and is exemplified by:

a procedure in which the specified amount of the carbonyl compound (II) is added in the step (1);

a procedure in which the specified amount of the carbonyl compound (II) is added in the step (2);

a procedure in which the specified amount of the carbonyl compound (II) is added to the EVOH (I) obtained in the step (2); and the like. However, when the procedure in which the specified amount of the carbonyl compound (II) is added in the step (1), or the procedure in which the specified amount of the carbonyl compound (II) is added in the step (2) is employed, in order to incorporate a desired amount of the carbonyl compound (II) into the resulting resin composition, it is necessary to increase the amount of the added carbonyl compound (II) taking into consideration the amount of the carbonyl compound (II) consumed in the polymerization reaction in the step (1) and/or the saponification reaction in the step (2). Therefore, in a case where the carbonyl compound (II) is added in the polymerization reaction and/or the saponification reaction step, it is preferred to further add the amount of the carbonyl compound (II) to be consumed. On the other hand, the procedure in which the specified amount of the carbonyl compound (II) is added to the EVOH (I) obtained in the step (2) achieves superior operability since the addition of the carbonyl compound (II) may be executed without taking into consideration the consumption thereof during the procedure.

The procedure for adding the specified amount of the carbonyl compound (II) to the EVOH (I) is exemplified by: a procedure in which blending the carbonyl compound (II) with the EVOH (I) is carried out beforehand, followed by pelletizing the blend to give pellets; a procedure in which a strand obtained by deposition of a paste after the saponification of the ethylene-vinyl ester copolymer is impregnated with the carbonyl compound (II); a procedure in which a strand obtained by deposition is impregnated with the carbonyl compound (II) after cutting the strand; a procedure in which the carbonyl compound (II) is added to a solution of redissolved chips of a dry resin composition; a procedure in which a blend of two components of the EVOH (I) and the carbonyl compound (II) is melt-kneaded; a procedure in which the carbonyl compound (II) is fed to be contained in a melt of the EVOH during extrusion; a procedure in which a masterbatch is produced by blending a high concentration of the carbonyl compound (II) with a part of the EVOH (I) and pelletizing the blend, the masterbatch is dry-blended with the EVOH (I) and the resulting mixture is melt-kneaded; and the like.

Of these, as a procedure for mixing the carbonyl compound (II), the procedure in which blending the carbonyl compound (II) with the EVOH (I) is carried out beforehand, followed by pelletizing the blend to give pellets is preferred in light of a possibility of homogeneously dispersing a slight amount of the carbonyl compound (II) in the EVOH (I). Specifically, the carbonyl compound (II) is added to a solution prepared by dissolving the resin composition in a good solvent such as a mixed solvent of water and methanol, and thus resulting mixture solution is extruded into a poor solvent through a nozzle or the like to permit deposition and/or coagulation, followed by washing and/or drying the same, whereby the pellets containing the resin composition with which the carbonyl compound (II) is homogeneously blended can be obtained.

Alternatively, in a step following the polymerization step, the carbonyl compound (II) may be added concomitantly with the conjugated polyene compound (III). By adding the carbonyl compound (II) concomitantly with the conjugated polyene compound (III), an auxiliary function of the conjugated polyene compound (III) is exhibited, and production of a substance that is resistant to heat melting is inhibited. As a result, a film having a superior appearance can be obtained.

The procedure for incorporating each component other than the carbonyl compound (II) into the EVOH layer (A) is exemplified by: a procedure in which the pellets are mixed with each component, followed by melt-kneading; a procedure in which each component is mixed together with carbonyl compound (II) in preparing the pellets; a procedure in which the pellets are immersed in a solution containing each component; and the like. It is to be noted that a ribbon blender, a high speed mixer, a cokneader, a mixing roll, an extruder, an intensive mixer and the like may be employed for mixing each component.

Thermoplastic Resin Layer (B)

The thermoplastic resin layer (B) contains a thermoplastic resin other than the EVOH (I). The thermoplastic resin preferably has a solubility parameter calculated using the Fedors equation of 11 $(cal/cm^3)^{1/2}$ or less.

The thermoplastic resin which may be contained in the thermoplastic resin layer (B) is not particularly limited, and examples thereof include: homopolymers or copolymers of an olefin, such as polyethylenes (linear low density polyethylene, low density polyethylene, medium-density polyethylene, high-density polyethylene, and the like), ethylene-vinyl acetate copolymers, ethylene-propylene copolymers, polypropylenes, copolymers of propylene with an α-olefin having 4 to 20 carbon atoms, polybutenes and polypentenes; polystyrenes, polyvinyl chlorides; polyvinylidene chlorides; acrylic resins; vinyl ester-based resins; polyurethane elastomers; polycarbonates; chlorinated polyethylenes and chlorinated polypropylenes; and the like. Of these, the polyethylenes, the ethylene-propylene copolymers, the ethylene-vinyl acetate copolymers, the polypropylenes and the polystyrenes are preferred, and the high-density polyethylene is more preferred.

In light of rigidity, impact resistance, moldability, drawdown resistance, gasoline resistance and the like, the lower limit of the density of the high-density polyethylene is preferably 0.93 g/cm$^3$, more preferably 0.95 g/cm$^3$, and still more preferably 0.96 g/cm. Moreover, in light of rigidity, impact resistance, moldability, drawdown resistance, gasoline resistance and the like, the upper limit of the density of the high-density polyethylene is preferably 0.98 g/cm$^3$. Furthermore, the lower limit of the melt flow rate (MFR) of the high-density polyethylene under a load of 2,160 g at 190° C. is preferably 0.01 g/10 min. Moreover, the upper limit of the melt flow rate (MFR) of the high-density polyethylene under a load of 2,160 g at 190° C. is preferably 0.5 g/10 min, and more preferably 0.1 g/10 min.

It is to be noted that the high-density polyethylene used may be appropriately selected, in general, from among commercially available products. In addition, the thermoplastic resin layer (B) may contain other optional component similar to those which may be contained in the EVOH layer (A), within a range not leading to impairment of the effects of the present invention. Examples of the other optional component include the colorant which may be contained in the EVOH layer, and the like.

The lower limit of the average thickness of the thermoplastic resin layer (B) is not particularly limited; in light of mechanical strength and the like, the lower limit of the ratio of average thickness of the thermoplastic resin layer (B) with respect to the overall average thickness is preferably 0.05%. In addition, the upper limit of the average thickness of the thermoplastic resin layer (B) is not particularly limited; in light of mechanical strength and the like, the upper limit of the average thickness of the thermoplastic resin layer (B) with respect to the overall average thickness is preferably 15%. The lower limit of the average thickness of the thermoplastic resin (B) is 5 μm, for example. Moreover, the upper limit of the average thickness of the thermoplastic resin (B) is 1,000 μm, for example.

Polyolefin Layer (C)

The polyolefin layer (C) contains a carboxylic acid-modified polyolefin as a principal component. The polyolefin layer (C) may function as an adhesion layer between the EVOH layer (A) and the thermoplastic resin layer (B) or the like. It is to be noted that the carboxylic acid-modified polyolefin as referred to means an olefin-derived polymer having a carboxyl group or an anhydride group therefrom, which may be obtained by chemically binding an ethylenic unsaturated carboxylic acid or an anhydride therefrom to an olefin-derived polymer through an addition reaction, a graft reaction, or the like.

The ethylenic unsaturated carboxylic acid or an anhydride therefrom is exemplified by a monocarboxylic acid, a monocarboxylic acid ester, a dicarboxylic acid, a dicarboxylic acid monoester, a dicarboxylic acid diester, a dicarboxylic acid anhydride, and the like. Specific examples of the ethylenic unsaturated carboxylic acid or the anhydride therefrom include maleic acid, fumaric acid, itaconic acid, maleic anhydride, itaconic anhydride, maleic acid monomethyl ester, maleic acid monoethyl ester, maleic acid diethyl ester, fumaric acid monomethyl ester, and the like. Of these, dicarboxylic acid anhydrides such as maleic anhydride and itaconic anhydride are preferred, and maleic anhydride is more preferred.

Examples of the olefin-derived polymer include:

polyolefins such as low-density, medium-density or high-density polyethylene, linear low density polyethylene, polypropylenes and polybutenes;

olefin-vinyl ester copolymers such as ethylene-vinyl acetate copolymers and ethylene-ethyl acrylate copolymers;

copolymers of an olefin with comonomer such as an unsaturated carboxylic acid ester; and the like. Of these, linear low density polyethylene, ethylene-vinyl acetate copolymers having a vinyl acetate content of 5% by mass to 55% by mass, ethylene-ethyl acrylate copolymers having an ethyl acrylate content of 8% by mass to 35% by mass are preferred, linear low density polyethylene and ethylene-vinyl acetate copolymers having a vinyl acetate content of 5% by mass to 55% by mass are more preferred.

The carboxylic acid-modified polyolefin is obtained by introducing the ethylenic unsaturated carboxylic acid or the anhydride therefrom into the olefin-derived polymer in the presence of, for example, a solvent such as xylene and a catalyst such as a peroxide through an addition reaction or a graft reaction. In this procedure, the lower limit of the amount of addition or grafting of the carboxylic acid or the anhydride therefrom to the olefin-derived polymer (i.e., degree of modification) is preferably 0.01% by mass, and more preferably 0.02% by mass with respect to the olefin-derived polymer. Moreover, the upper limit of the amount of addition or grafting of the carboxylic acid or the anhydride therefrom to the olefin-derived polymer (i.e., degree of modification) is preferably 15% by mass, and more preferably 10% by mass. The carboxylic acid-modified polyolefin may be used either alone of one type, or as a mixture of two or more thereof. It is to be noted that the polyolefin layer (C) may contain in addition to the carboxylic acid-modified polyolefin, other optional component similar to those which may be contained in the EVOH layer (A), within a range not leading to impairment of the effects of the present invention.

The lower limit of the average thickness of the polyolefin layer (C) is not particularly limited; the lower limit of the average thickness of the polyolefin layer (C) with respect to the overall average thickness is preferably 0.3%, more preferably 0.6%, and still more preferably 1.2%. Moreover, the upper limit of the average thickness of the polyolefin layer (C) is not particularly limited; the upper limit of the average thickness of the polyolefin layer (C) with respect to the overall average thickness is preferably 12%, and more preferably 9%. When the thickness of the polyolefin layer (C) is less than the lower limit, the adhesiveness of the polyolefin layer (C) may be inferior. On the other hand, when the thickness of the polyolefin layer (C) is greater than the upper limit, the cost of the polyolefin layer (C) may be increased. The lower limit of the average thickness of the polyolefin layer (C) is 2 μm, for example. Moreover, the upper limit of the average thickness of the polyolefin layer (C) is 100 μm, for example.

Recovery Layer (D)

The recovery layer (D) is a layer provided by using a recovered material of at least one of the EVOH layer (A), the thermoplastic resin layer (B) and the polyolefin layer (C) in the production process of the thermoformed container. The recovery layer (D) contains at least one of the EVOH (I), the thermoplastic resin having a solubility parameter calculated using the Fedors equation of 11 $(cal/cm^3)^{1/2}$ or less, and the carboxylic acid-modified polyolefin. In addition, the recovery layer (D) is formed using a recovered material of the EVOH layer (A), the thermoplastic resin layer (B) and/or the polyolefin layer (C) in the production process of the thermoformed container, products failed an inspection, and the like. Providing the recovery layer (D) formed by recycling such a scrap and the like enables a reduction of a loss of the resin used in the production of the thermoformed container, leading to a cost reduction.

The recovery layer (D) may be used as a substitute for the thermoplastic resin layer (B). However, in general, the recovery layer (D) is preferably used as a laminate with the thermoplastic resin layer (B) since the recovery layer (D) usually has lower mechanical strength than the thermoplastic resin layer (B). The recovery layer (D) is preferably arranged so as to be situated on the outer surface side of the retaining portion with respect to the EVOH layer (A) because upon an external impact applied to the thermoformed container, concentration of stress would occur in the thermoformed container, and in the stress concentration area, a compression stress in response to the impact would be generated on the inner layer side of the container (i.e., the inner surface side of the retaining portion), leading to breakage thereof. Moreover, according to the recovery layer (D), in a case where a large amount of the resin needs to be recycled, e.g., in the case of the generation of a large amount of the scrap, the recovery layer (D) may be arranged on both sides of the EVOH layer (A).

The upper limit of the content of the EVOH in the recovery layer (D) is preferably 9.0% by mass. When the content of the EVOH in the recovery layer (D) is greater than 9.0% by mass, a crack is likely to be generated at the interface between the recovery layer (D) and the thermoplastic resin layer (B), and then the breakage of the entire thermoformed container, starting from the crack, may occur.

Production Method of Multilayer Structure

The multilayer structure may be formed using a coextrusion molding apparatus. The multilayer structure is formed as an article having a predetermined layer structure by, for example, charging a resin composition for forming the EVOH layer (A), a resin composition for forming the thermoplastic resin layer (B), a resin composition for forming the polyolefin layer (C), a resin composition for forming the recovery layer (D), and the like into separate extruders, and carrying out coextrusion using these extruders.

The extrusion-molding of each layer is carried out by operating an extruder provided with a single screw or a twin-screw at a certain temperature. The lower limit of the temperature of an extruder for forming the EVOH layer (A) is 170° C., for example. Moreover, the upper limit of the temperature of the extruder for forming the EVOH layer (A) is 210° C., for example. The lower limit of the temperature of an extruder for forming the thermoplastic resin layer (B) is 200° C., for example. Moreover, the upper limit of the temperature of the extruder for forming the thermoplastic resin layer (B) is 240° C., for example. The lower limit of the temperature of an extruder for forming the polyolefin layer (C) is 160° C., for example. Moreover, the upper limit of the temperature of the extruder for forming the polyolefin layer (C) is 220° C., for example. The lower limit of the temperature of an extruder for forming the recovery layer (D) is 200° C., for example. Moreover, the upper limit of the temperature of the extruder for forming the recovery layer (D) is 240° C., for example.

Thermoforming

The thermoformed container can be formed by heating a multilayer structure in the form of a film, a sheet or the like to be softened, and thereafter subjecting the multilayer structure to forming so as to fit a die shape. The thermoforming method is exemplified by: a method involving carrying out the forming so as to fit a die shape by means of vacuum or compressed air, which may be used in combination with a plug as needed (a straight process, a drape process, an air slip process, a snap-back process, a plug-assist process, and the like); a method involving press forming; and the like. Various forming conditions such as the forming temperature, the degree of vacuum, the pressure of the compressed air, and the forming speed are appropriately selected in accordance with the shape of the plug and/or the die, as well as properties of a film and/or a sheet as a base material, and the like. The forming temperature is not particularly limited as long as the resin is softened sufficiently to be formed at the temperature, and a suitable range of the temperature may vary in accordance with the construction of the multilayer structure such as the film and the sheet.

In a case where the film is subjected to thermoforming, it is desired that the temperature of heating is not: too high where melting of the film by heating occurs or the roughness of a metal surface of a heater plate is transferred to the film; or too low where shaping cannot be sufficiently attained. Specifically, the lower limit of the film temperature is typically 50° C., preferably 60° C., and more preferably 70° C. Moreover, the upper limit of the film temperature is typically 120° C., preferably 110° C., and more preferably 100° C.

On the other hand, in a case where the sheet is subjected to thermoforming, forming may be carried out at a higher temperature than that for the film. In this case, the lower limit of the sheet temperature is 130° C., for example. Moreover, the upper limit of the sheet temperature is 180° C., for example.

The thermoformed container is preferably produced according to a production method including: the step of carrying out thermoforming using the resin composition containing the EVOH (I) as a principal component, wherein the resin composition contains the carbonyl compound (II), and the content of the carbonyl compound (II) in the resin composition is 0.05 ppm or greater and 50 ppm or less. The lower limit of the content of the carbonyl compound (II) in the resin composition is preferably 0.1 ppm, and more preferably 0.15 ppm. Moreover, the upper limit of the content of the carbonyl compound (II) in the resin composition is preferably 30 ppm, and more preferably 20 ppm.

Layer Structure

The thermoformed container according to the embodiment of the present invention may include a single layer or a plurality of layers as long as the thermoformed container includes at least EVOH layer (A). In a case where the thermoformed container includes a plurality of layers, the layer structure may be appropriately selected in accordance with an intended usage thereof, and the like.

In the layer structure in the case where the thermoformed container includes a plurality of layers, the thermoplastic resin layer (B) is preferably provided as the outermost layer. In other words, providing in an order of: the thermoplastic resin layer (B)/polyolefin layer (C)/EVOH layer (A)/polyolefin layer (C)/thermoplastic resin layer (B) from the inner surface of the retaining portion toward the outer surface of the retaining portion (hereinafter, represented by, e.g., "(B)/(C)/(A)/(C)/(B) from the inner surface to the outer surface") is preferred in light of the impact resistance. Furthermore, in a case where the recovery layer (D) is included, examples of the layer structure include:

(B)/(C)/(A)/(C)/(D)/(B) from the inner surface to the outer surface;

(B)/(D)/(C)/(A)/(C)/(B) from the inner surface to the outer surface;

(B)/(D)/(C)/(A)/(C)/(D)/(B) from the inner surface to the outer surface;

(D)/(C)/(A)/(C)/(D) from the inner surface to the outer surface; and the like, and in these layer structures, the recovery layer (D) is provided in place of the thermoplastic resin (B) layer. Of these, the construction of (B)/(C)/(A)/(C)/(D)/(B) from the inner surface to the outer surface and the construction of (B)/(D)/(C)/(A)/(C)/(D)/(B) from the inner surface to the outer surface are preferred. It is to be noted that in the case of a construction in which the layer (A) to the layer (D) are each used in a plurality of number, the resin constituting each layer may be identical or different.

Cup-Shaped Container

Figure 2:
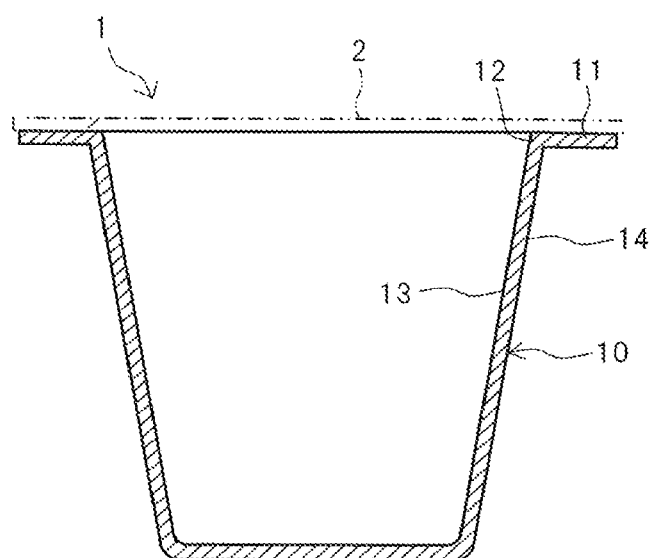
FIG. 2 shows a cross sectional view illustrating the cup-shaped container shown in FIG. 1.

Next, a cup-shaped container shown in FIGS. 1 and 2 will be specifically described by way of an example of the thermoformed container according to the embodiment of the present invention. However, the cup-shaped container is merely an example of the thermoformed container, and the following explanation of the cup-shaped container does not limit the scope of the present invention.

The cup-shaped container 1 shown in FIGS. 1 and 2 includes a cup main body 10 as the retaining portion, and a flange portion 11. The cup-shaped container 1 is used such that contents are retained in the cup main body 10 and thereafter a lid 2 as a sealer is attached to the flange portion 11 so as to seal an opening 12 of the cup main body 10. The sealer is exemplified by a resin film, a metal foil, a metal-resin composite film, and the like, and among these, a metal-resin composite film in which a metal layer is laminated on a resin film is preferred. Examples of the resin film include polyethylene films, polyethylene terephthalate films, and the like. The metal layer is not particularly limited, and is preferably a metal foil or a metal vapor deposition layer, and is more preferably an aluminum foil in light of gas barrier properties and productivity.

The cup-shaped container 1 may be obtained by, for example, subjecting a multilayer structure in a film form, a sheet form or the like to thermoforming. It is preferred that the multilayer structure includes the EVOH layer (A) and other layer is laminated on the EVOH layer (A). The other layer is exemplified by the thermoplastic resin layer (B), the polyolefin layer (C), the recovery layer (D), and the like.

Figure 3:
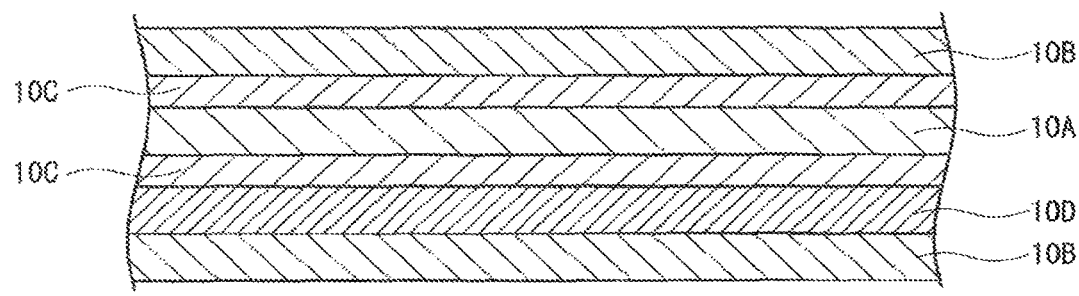
FIG. 3 shows a schematic cross sectional view illustrating a detail of the cup-shaped container shown in FIG. 1.

The layer structure of the cup-shaped container 1 is preferably a structure shown in FIG. 3. In the layer structure shown in FIG. 3, the thermoplastic resin layer (B) 10B is laminated on one face side (the inner surface 13 side of the cup main body 10 of the cup 1) of the EVOH layer (A) 10A with the polyolefin layer (C) 10C being interposed therebetween, and the recovery layer (D) 10D and the thermoplastic resin layer (B) 10B are laminated on the other face side (the outer surface 14 side of the cup main body 10 of the cup 1) of the EVOH layer (A) 10A with the polyolefin layer (C) 10C being interposed between the EVOH layer (A) 10A and the recovery layer (D) 10D.

Production Method of Cup-Shaped Container

Figure 4:
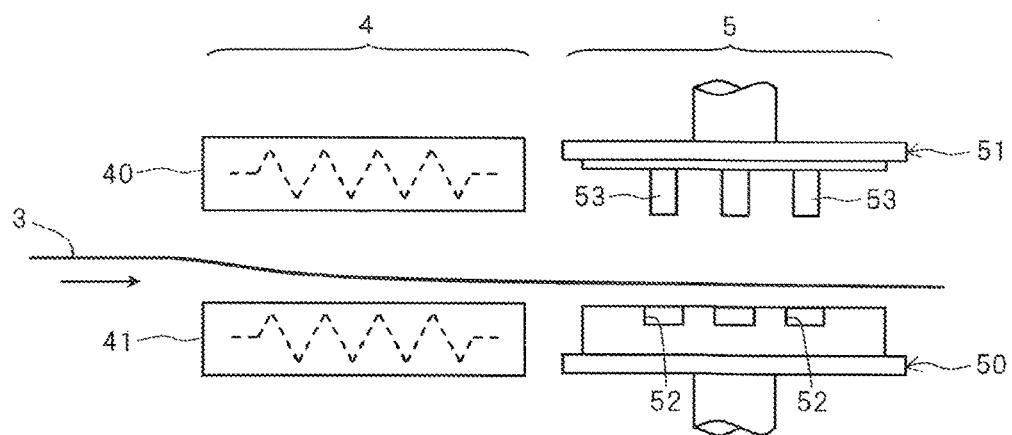
FIG. 4 shows a schematic view for illustrating the production method of the cup-shaped container shown in FIG. 1.

As shown in FIG. 4, the cup-shaped container 1 is produced by heating a continuous multilayer structure 3 in a film form, a sheet form or the like by means of the heating apparatus 4 to soften the continuous multilayer structure 3, and thereafter subjecting the softened continuous multilayer structure 3 to thermoforming using a die apparatus 5.

Heating Apparatus

The heating apparatus 4 is provided with a pair of heaters 40, 41, and is configured such that the continuous multilayer structure 3 can be passed between these heaters 40, 41. It is to be noted that an apparatus that can heat the continuous multilayer structure 3 by hot pressing may be used as the heating apparatus 4.

Die Apparatus

The die apparatus 5 is suitable for thermoforming by a plug-assist process, and includes a lower mold half 50 and an upper mold half 51 that are placed in a chamber (not shown in the Figure). The lower mold half 50 and the upper mold half 51 are configured such that they are each independently vertically movable, and in a state of being spaced apart from one another, the continuous multilayer structure 3 can be passed between the lower mold half 50 and the upper mold half 51. The lower mold half 50 includes a plurality of recessed parts 52 for shaping the retaining portion 10 of the thermoformed container 1. The upper mold half 51 includes a plurality of plugs 53 that protrude toward the lower mold half 51. The plurality of plugs 53 are each arranged in the position corresponding to each of the plurality of recessed parts 52 of the lower mold half 50. Each plug 53 can be inserted into the corresponding recessed part 52.

Thermoforming

Figure 5:
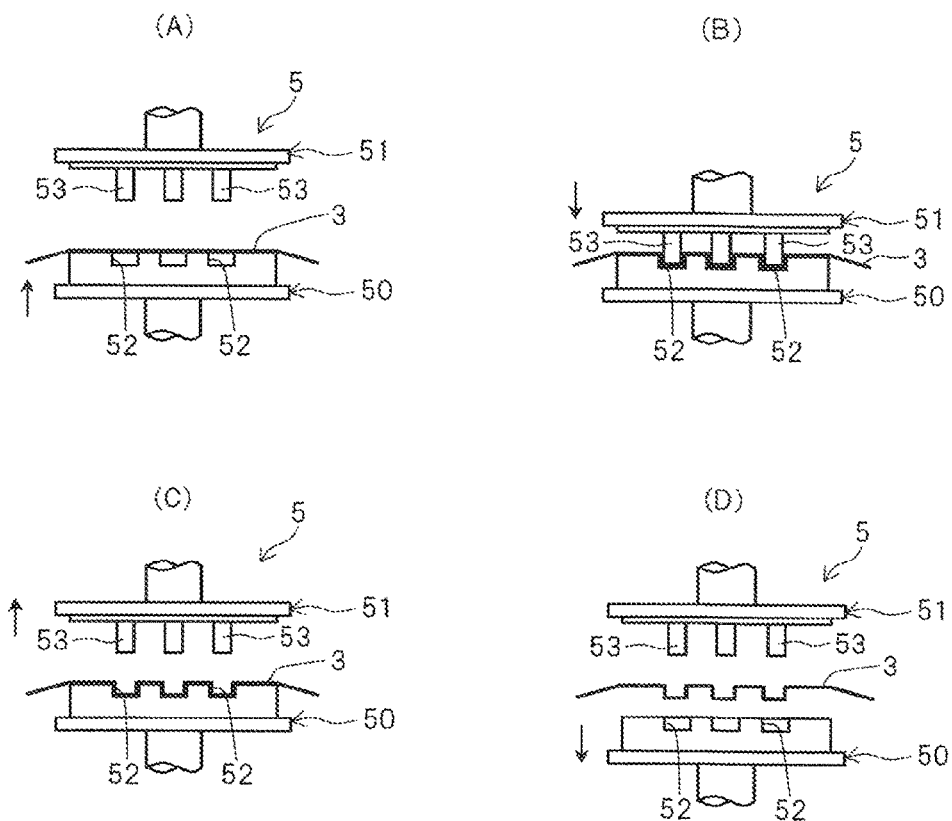
FIG. 5 shows a schematic view for illustrating the production method of the cup-shaped container shown in FIG. 1.

First, as shown in FIG. 5(A), the lower mold half 50 is moved upward with respect to the continuous multilayer structure 3 which has been softened using the heating apparatus 4 to bring the softened continuous multilayer structure 3 into close contact with the lower mold half 50, and the continuous multilayer structure 3 is somewhat lifted up to apply tension to the continuous multilayer structure 3. Next, as shown in FIG. 5(B), the upper mold half 51 is moved downward, whereby the plugs 53 are inserted into each corresponding recessed part 52.

Subsequently, as shown in FIG. 5(C), the upper mold half 51 is moved upward to separate the plugs 53 from each corresponding recessed part 52, and the inside of the chamber (not shown in the Figure) is evacuated to bring the continuous multilayer structure 3 into close contact with the inner face of the recessed parts 52. Thereafter, the mold is cooled by blowing air thereonto to fix the shape. As shown in FIG. 5(D), the inside of the chamber (not shown in the Figure) is exposed to ambient air and the lower mold half 50 is moved downward to release the lower mold half 50, whereby a primary formed article is obtained. The primary formed article is cut to give the cup-shaped container 1 shown in FIGS. 1 and 2.

EXAMPLES

Hereinafter, the present invention is specifically explained by way of Examples, but the present invention is not in anyhow limited to these Examples. It is to be noted that in the following, "%" and "part(s)" represent respectively "% by mass" and "part(s) by mass" unless otherwise specified in particular.

Synthesis of EVOH

Synthesis Example 1

Using a 250 L pressure reactor, the polymerization was carried out under the following conditions to synthesize an ethylene-vinyl acetate copolymer.

Amount Charged vinyl acetate: 83.0 kg methanol: 26.6 kg feed rate of 2,2'-azobis(4-methoxy-2,4-dimethylvaleronitrile) (2.5 g/L methanol solution): 1,119.5 mL/hr Polymerization Conditions polymerization temperature: 60° C.

pressure of ethylene in polymerization tank: 3.6 MPa polymerization time period: 5.0 hours The conversion of vinyl acetate in the resulting copolymer was about 40%. After sorbic acid was added to this copolymerization reaction mixture, the reaction mixture was supplied to a purge tower, and unreacted vinyl acetate was eliminated from the top of the tower by introducing methanol vapor from the bottom of the tower, whereby a 41% methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester component in the copolymer. Thereto was further added methanol to adjust the copolymer concentration to 20%. The temperature of this solution was elevated to 60° C., and the reaction was allowed while blowing nitrogen gas into the reactor for about 4 hours. This solution was then extruded from a die plate provided with a circular opening into water to permit deposition, followed by cutting to give pellets having a diameter of about 3 mm and a length of about 5 mm. The resulting pellets were subjected to deliquoring in a centrifugal separator, and an operation of further adding a large amount of water thereto and deliquoring the pellets was repeated.

Synthesis Example 2

Pellets were obtained in a similar manner to Synthesis Example 1 except that sorbic acid used in Synthesis Example 1 and crotonaldehyde were simultaneously added.

Synthesis Example 3

Pellets were obtained in a similar manner to Synthesis Example 1 except that sorbic acid used in Synthesis Example 1 and propanal were simultaneously added.

Synthesis Example 4

Pellets were obtained in a similar manner to Synthesis Example 1 except that sorbic acid used in Synthesis Example 1 and acetone were simultaneously added.

Example 1

Preparation of EVOH-Containing Resin Composition

Twenty kg of the deliquored pellets obtained in Synthesis Example 1 were added to 180 kg of a mixed solvent of water and methanol (mass ratio: water/methanol=40/60), and the mixture was stirred at 60° C. for 6 hours to completely dissolve the pellets. To the solution thus obtained were added crotonaldehyde, and sorbic acid as the conjugated polyene compound (III), and this mixture was further stirred for 1 hour such that crotonaldehyde and sorbic acid were completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin composition chips. The resulting porous resin composition chips were washed with an aqueous acetic acid solution and ion exchanged water. The resin composition chips were separated from the washing liquid, followed by deliquoring, and thereafter were dried in a hot-air dryer at 80° C. for 4 hours and further at 100° C. for 16 hours to obtain a resin composition (dry resin composition pellets).

Preparation of Coextruded Film

Homopolypropylene ("PY220" available from Mitsubishi Noblen) for forming the thermoplastic resin layer (B), an EVOH resin composition for forming the EVOH layer (A), carboxylic acid-modified polyolefin ("QF-500" available from Mitsui Chemicals Admer, Inc.) for forming the olefin layer (C), a resin mixture for forming the recovery layer (D) were charged into separate extruders of a coextrusion molding apparatus, and a multilayer sheet having a layer structure of (B): 425 μm/(C): 50 μm/(A): 50 μm/(C): 50 μm/(D): 250 μm/(B): 425 μm and the entire layer thickness of 1,250 μm was prepared. The extrusion-molding of the homopolypropylene was carried out by operating an extruder provided with a single screw having a diameter of 65 mm and L/D of 22 at a temperature of 200° C. to 240° C. The extrusion-molding of the EVOH resin composition was carried out by operating an extruder provided with a single screw having a diameter of 40 mm and L/D of 26 at a temperature of 170° C. to 210° C. The extrusion-molding of the carboxylic acid-modified polyolefin was carried out by operating an extruder provided with a single screw having a diameter of 40 mm and L/D of 26 at a temperature of 160° C. to 220° C. The extrusion-molding of the resin mixture for the recovery layer (D) was carried out by operating a twin-screw extruder ("2D25W" available from Toyo Seiki Seisaku-sho, Ltd.; diameter: 25 mm; screw rotation speed: 100 rpm) with the temperature of a cylinder and a die of 220° C. and the temperature of a feed block die (width: 600 mm) of 255° C.

It is to be noted that the resin mixture for forming the recovery layer (D) was prepared as in the following. After 6.7 parts by mass of the EVOH resin composition for forming the EVOH layer (A), 88.3 parts by mass of the homopolypropylene ("PY220" available from Mitsubishi Noblen) for forming the thermoplastic resin layer (B), and 5.0 parts by mass of the carboxylic acid-modified polyolefin ("QF-500" available from Mitsui Chemicals Admer, Inc.) for forming the olefin layer (C) were dry-blended, the blend was extruded and pelletized under a nitrogen atmosphere using a twin-screw extruder ("2D25W" available from Toyo Seiki Seisaku-sho, Ltd.; diameter: 25 mm; screw rotation speed: 100 rpm) with the temperature of a cylinder and a die of 220° C. to obtain pellets. The operation of kneading the pellets in the twin-screw extruder under a nitrogen atmosphere to give a blend and thereafter extruding the blend from the twin-screw extruder to give pellets was further repeated four times to obtain the resin mixture for forming the recovery layer (D).

Preparation of Thermoformed Container

The multilayer sheet obtained using the coextrusion molding apparatus was cut into a 15 cm square piece, and the piece was subjected to thermoforming (compressed air: 5 kg/cm$^2$; plug: 45φ×65 mm; syntax form; plug temperature: 150° C.; die temperature: 70° C.) using a batch-wise thermoforming and testing machine available from Asano Laboratories Co. Ltd. under a condition involving a sheet temperature of 150° C. so as to give a cup shape (die shape: 70φ×70 mm; draw ratio (S): 1.0), whereby a thermoformed container was prepared.

Examples 2 to 42, and Comparative Examples 1, 2, 4, 5, 7 and 8

A multilayer sheet was prepared in a similar manner to Example 1 except that a resin composition was prepared so as to give the content of each component as shown in Tables 1 to 3, and the multilayer sheet was subjected to thermoforming to prepare a thermoformed container.

Comparative Examples 3, 6 and 9

A multilayer sheet was prepared in a similar manner to Example 2 except that the pellets obtained in Synthesis Example 2 were used, and the multilayer sheet was subjected to thermoforming to prepare a thermoformed container of Comparative Example 3. A multilayer sheet was prepared in a similar manner to Example 2 except that the pellets obtained in Synthesis Example 3 were used, and the multilayer sheet was subjected to thermoforming to prepare a thermoformed container of Comparative Example 6. A multilayer sheet was prepared in a similar manner to Example 2 except that the pellets obtained in Synthesis Example 4 were used, and the multilayer sheet was subjected to thermoforming to prepare a thermoformed container of Comparative Example 9.

Evaluations

The resin compositions, the multilayer sheets and the thermoformed containers prepared in Examples 1 to 42 and Comparative Examples 1 to 9 were evaluated for the content of the carbonyl compound (II), the content of the conjugated polyene compound (III), the average thickness of the EVOH layer (A), the content of the EVOH in the EVOH layer (A), the odor in forming, the appearance of the solution, the motor torque fluctuation, the appearance characteristics and the impact resistance according to the procedure described below. The results of the evaluations are shown in Tables 1 to 3.

Quantitative Determination of Content of Carbonyl Compound (II)

An adjusted 2,4-dinitrophenylhydrazine (DNPH) solution was prepared by adding 50 mL of 1,1,1,3,3,3-hexafluoroisopropanol (HFIP), 11.5 mL of acetic acid and 8 mL of ion exchanged water to 200 mg of a 50% solution of DNPH. Thereafter, 1 g of dry resin composition pellets were added to 20 mL of the adjusted DNPH solution, and the mixture was stirred at 35° C. for 1 hour to dissolve the dry resin composition pellets. Acetonitrile was added to this solution to permit precipitation of the EVOH, followed by filtration and concentration of the solution, whereby an extraction sample was obtained. This extraction sample was analyzed for quantitative determination by high performance liquid chromatography, whereby the carbonyl compound (II) was quantitatively determined. In the quantitative determination, a calibration curve created using an authentic sample of each carbonyl compound (II) was used.

Quantitative Determination of Content of Conjugated Polyene Compound (III)

Dry resin composition pellets were ground by freeze grinding, and 10 g of a ground matter obtained by eliminating coarse particles using a sieve having a nominal dimension of 0.150 mm (100 mesh, according to JIS Z8801-1 to 3) was packed into a Soxhlet extraction apparatus to execute an extraction treatment using 100 mL of chloroform for 48 hours. This extraction liquid was analyzed for quantitative determination of the amount of the conjugated polyene compound (III) by high performance liquid chromatography. Thus, the amount of the conjugated polyene compound (III) was quantitatively determined. It is to be noted that in the quantitative determination, a calibration curve created using an authentic sample of each conjugated polyene compound (III) was used.

Measurement of Average Thickness of EVOH Layer (A)

For the measurement of the average thickness of the EVOH layer (A), the cross section of a sample taken from a thermoformed container was observed using a scanning electron microscope, and a photograph obtained was subjected to image processing. Then, the average thickness of the EVOH layer (A) was calculated as a proportion (%) of an average of the thickness values determined at arbitrary 10 points in the image obtained in this procedure, with respect to the overall average thickness.

Content of EVOH in EVOH Layer (A)

The content of the EVOH in the EVOH layer (A) was deemed to be identical to the content of the EVOH in the dry resin composition used for forming the EVOH layer (A).

Odor in Forming

The odor in forming was evaluated according to the following method. Into a 100 mL glass sample tube were charged 20 g of a resin composition obtained by kneading in a Laboplast Mill, and the opening of the sample tube was covered with an aluminum foil lid. Then, the sample tube was heated in a hot-air dryer at 150° C. for 90 min. The sample tube was taken out from the dryer and allowed to cool at room temperature for 1 hour. Thereafter, the sample tube was shaken two or three times, and checked for odor after removing the aluminum foil lid. The intensity of the odor of the sample pellets was evaluated according to the following criteria.

A (favorable): an odor not being recognized;

B (somewhat favorable): an odor being slightly recognized;

C (somewhat unfavorable): an odor being clearly recognized; and

D (unfavorable): a strong odor being recognized with an irritating odor.

Evaluation of Appearance of Solution

Ten grams of EVOH pellets that had been subjected to a heat treatment in an air at 120° C. for 15 hours were charged into a 300 mL Erlenmeyer flask, and 100 mL of a mixed solution of water and propanol (mass ratio: water/propanol=45/55) was added thereto, followed by stirring at 75° C. for 3 hours to permit dissolution. The appearance of the resulting solution was evaluated according to the following criteria.

Evaluation Criteria of Transparency

A (favorable): the solution being transparent, and suspended matter recognizable by the visual inspection being absent;

B (somewhat favorable): the solution being somewhat turbid, and suspended matter recognizable by the visual inspection being present; and C (unfavorable): the solution being turbid, and suspended matter being present.

Evaluation Criteria of Coloring of Solution

A (favorable): colorless;

B (somewhat favorable): somewhat yellowed; and

C (unfavorable): significantly yellowed.

Evaluation of Motor Torque Fluctuation

A change in torque when 60 g of EVOH pellets were kneaded in a Laboplast Mill ("20R200" available from Toyo Seiki Seisaku-sho, Ltd.; twin-screw, counter rotating type) at 100 rpm and 260° C. was measured. The torque was measured after 5 min from the beginning of the kneading, and the motor torque was evaluated in accordance with a time period which was required until the torque value reached 1.5 times the aforementioned torque value after 5 min from the beginning. This time period being longer indicates less change in viscosity, and more superior long-run workability.

Determination Criteria

A: 60 min or longer;

B: 40 min or longer and shorter than 60 min;

C: 20 min or longer and shorter than 40 min.

Evaluation of Appearance of Thermoformed Container

With respect to a thermoformed container formed using a multilayer sheet obtained after 6 hours from the starting of a coextrusion molding apparatus, evaluations on appearance characteristics were made through evaluating streaks and coloring by a visual inspection in accordance with the following criteria.

Evaluation Criteria of Streaks

A (favorable): no streaks found;

B (somewhat favorable): streaks found; and

C (unfavorable): a large number of streaks found.

Evaluation Criteria of Coloring

A (favorable): colorless;

B (somewhat favorable): yellowed; and

C (unfavorable): significantly yellowed.

Evaluation of Impact Resistance

A thermoformed container formed from a multilayer sheet obtained after 20 min, 40 min, or 10 hours from the starting of a coextrusion molding apparatus was filled with 250 mL of ethylene glycol, and the opening was capped by heat sealing using a film having a three-layer structure of polyethylene 40 μm/aluminum foil 12 μm/polyethylene terephthalate 12 μm. This thermoformed container was cooled at −40° C. for 3 days. Ten thermoformed containers thus treated were dropped from a height of 6 m with the opening of the thermoformed containers facing upward, and the impact resistance was evaluated in accordance with the number of broken thermoformed containers. It is to be noted that the impact resistance of the samples formed from the multilayer sheet obtained after 20 min from the starting of the coextrusion molding apparatus is an indicator of the self-purge feature.

Evaluation Criteria of Impact Resistance:

A (favorable): less than 3;

B (somewhat favorable): 3 to less than 6; and

C (unfavorable): 6 or greater.

TABLE 1

| | Unsaturated aldehyde (II-1) | | Conjugated polyene compound (III) | | Ratio of average thickness of layer (A) (%) | EVOH content in layer (D) (% by mass) | Evaluations odor in forming |
|---|---|---|---|---|---|---|---|
| | substance | content (ppm) | type | content (ppm) | | | |
| Example 1 | crotonaldehyde | 35 | sorbic acid | 1,200 | 4 | 6.7 | B |
| Example 2 | crotonaldehyde | 0.3 | sorbic acid | 200 | 4 | 6.7 | B |
| Example 3 | crotonaldehyde | 0.3 | sorbic acid | 0.01 | 4 | 6.7 | B |
| Example 4 | crotonaldehyde | 0.3 | sorbic acid | 0.2 | 4 | 6.7 | B |
| Example 5 | crotonaldehyde | 0.3 | sorbic acid | 950 | 4 | 6.7 | B |
| Example 6 | crotonaldehyde | 0.3 | sorbic acid | 2,000 | 4 | 6.7 | B |
| Example 7 | crotonaldehyde | 0.3 | potassium sorbate | 200 | 4 | 6.7 | B |
| Example 8 | crotonaldehyde | 0.3 | myrcene | 200 | 4 | 6.7 | B |
| Example 9 | crotonaldehyde | 2.5 | sorbic acid | 200 | 4 | 6.7 | B |
| Example 10 | crotonaldehyde | 18 | sorbic acid | 200 | 4 | 6.7 | B |
| Example 11 | crotonaldehyde | 0.08 | sorbic acid | 200 | 4 | 6.7 | C |
| Example 12 | crotonaldehyde | 90 | sorbic acid | 50 | 4 | 6.7 | C |
| Example 13 | 2,4-hexadienal | 0.3 | sorbic acid | 200 | 4 | 6.7 | C |
| Example 14 | 2,4,6-octatrienal | 0.3 | sorbic acid | 200 | 4 | 6.7 | C |
| Comparative Example 1 | crotonaldehyde | N.D. *1 | sorbic acid | 1,000 | 4 | 6.7 | D |
| Comparative Example 2 | crotonaldehyde | 500 | sorbic acid | 200 | 4 | 6.7 | D |
| Comparative Example 3 | crotonaldehyde | N.D. *1 | sorbic acid | 6,000 | 4 | 6.7 | D |

TABLE 1-continued

| | Evaluations | | | | | | | |
|---|---|---|---|---|---|---|---|---|
| | appearance of solution | | motor torque | appearance characteristics | | impact resistance | | |
| | transparency | coloring | fluctuation | streak | coloring | 20 min | 40 min | 10 hours |
| Example 1 | A | B | A | B | B | A | B | B |
| Example 2 | A | A | A | A | A | A | A | A |
| Example 3 | A | B | B | B | B | A | B | B |
| Example 4 | A | B | B | A | A | A | A | A |
| Example 5 | A | B | B | A | A | A | A | A |
| Example 6 | A | B | B | B | B | B | B | B |
| Example 7 | A | A | A | A | A | A | A | A |
| Example 8 | A | B | B | A | A | A | A | B |
| Example 9 | A | A | A | A | A | A | A | A |
| Example 10 | A | B | A | A | A | A | A | A |
| Example 11 | A | B | A | B | B | A | B | B |
| Example 12 | A | A | A | A | A | A | A | A |
| Example 13 | A | B | B | A | B | A | B | B |
| Example 14 | A | B | B | A | B | A | B | B |
| Comparative Example 1 | C | C | C | B | B | B | C | C |
| Comparative Example 2 | C | C | C | C | C | C | C | C |
| Comparative Example 3 | C | C | C | C | C | C | C | C |

N.D. *1: less than detection lower limit (0.01 ppm)

TABLE 2

| | Saturated aldehyde (II-2) | | Conjugated polyene compound (III) | | Ratio of average thickness of layer (A) (%) | EVOH content in layer (D) (% by mass) | Evaluations odor in forming |
|---|---|---|---|---|---|---|---|
| | substance | content (ppm) | type | content (ppm) | | | |
| Example 15 | propanal | 35 | sorbic acid | 1,200 | 4 | 6.7 | B |
| Example 16 | propanal | 0.3 | sorbic acid | 200 | 4 | 6.7 | B |
| Example 17 | propanal | 0.3 | sorbic acid | 0.01 | 4 | 6.7 | B |
| Example 18 | propanal | 0.3 | sorbic acid | 0.2 | 4 | 6.7 | B |
| Example 19 | propanal | 0.3 | sorbic acid | 950 | 4 | 6.7 | B |
| Example 20 | propanal | 0.3 | sorbic acid | 2,000 | 4 | 6.7 | B |
| Example 21 | propanal | 0.3 | potassium sorbate | 200 | 4 | 6.7 | B |
| Example 22 | propanal | 0.3 | myrcene | 200 | 4 | 6.7 | B |
| Example 23 | propanal | 2.5 | sorbic acid | 200 | 4 | 6.7 | B |
| Example 24 | propanal | 18 | sorbic acid | 200 | 4 | 6.7 | B |
| Example 25 | propanal | 0.08 | sorbic acid | 200 | 4 | 6.7 | B |
| Example 26 | propanal | 90 | sorbic acid | 50 | 4 | 6.7 | C |
| Example 27 | butanal | 35 | sorbic acid | 200 | 4 | 6.7 | C |
| Example 28 | hexanal | 35 | sorbic acid | 200 | 4 | 6.7 | C |
| Comparative Example 4 | propanal | N.D. *1 | sorbic acid | 1,000 | 4 | 6.7 | D |
| Comparative Example 5 | propanal | 500 | sorbic acid | 200 | 4 | 6.7 | D |
| Comparative Example 6 | propanal | N.D. *1 | sorbic acid | 6,000 | 4 | 6.7 | D |

| | Evaluations | | | | | | | |
|---|---|---|---|---|---|---|---|---|
| | appearance of solution | | motor torque | appearance characteristics | | impact resistance | | |
| | transparency | coloring | fluctuation | streak | coloring | 20 min | 40 min | 10 hours |
| Example 15 | A | B | A | B | B | A | B | B |
| Example 16 | A | B | A | A | A | A | A | A |
| Example 17 | A | B | B | B | B | A | B | B |
| Example 18 | A | B | B | A | A | A | A | B |
| Example 19 | A | B | B | A | A | A | A | A |
| Example 20 | A | B | B | B | B | B | B | B |

TABLE 2-continued

|  | | | | | | | | |
|---|---|---|---|---|---|---|---|---|
| Example 21 | A | A | A | A | A | A | A | A |
| Example 22 | A | B | B | A | A | A | A | B |
| Example 23 | A | A | A | A | A | A | A | A |
| Example 24 | A | B | A | A | A | A | A | A |
| Example 25 | A | B | A | B | B | A | B | B |
| Example 26 | A | A | A | A | A | A | A | A |
| Example 27 | A | B | B | A | B | A | B | B |
| Example 28 | A | B | B | A | B | A | B | B |
| Comparative Example 4 | C | C | C | B | B | B | C | C |
| Comparative Example 5 | C | C | C | C | C | C | C | C |
| Comparative Example 6 | C | C | C | C | C | C | C | C |

N.D. *[1]: less than detection lower limit (0.01 ppm)

TABLE 3

|  | Saturated ketone (II-3) | | Conjugated polyene compound (III) | | Ratio of average thickness of layer (A) (%) | EVOH content in layer (D) (% by mass) | Evaluations odor in forming |
|---|---|---|---|---|---|---|---|
|  | substance | content (ppm) | type | content (ppm) | | | |
| Example 29 | acetone | 35 | sorbic acid | 1,200 | 4 | 6.7 | B |
| Example 30 | acetone | 0.3 | sorbic acid | 200 | 4 | 6.7 | B |
| Example 31 | acetone | 0.3 | sorbic acid | 0.01 | 4 | 6.7 | B |
| Example 32 | acetone | 0.3 | sorbic acid | 0.2 | 4 | 6.7 | B |
| Example 33 | acetone | 0.3 | sorbic acid | 950 | 4 | 6.7 | B |
| Example 34 | acetone | 0.3 | sorbic acid | 2,000 | 4 | 6.7 | B |
| Example 35 | acetone | 0.3 | potassium sorbate | 200 | 4 | 6.7 | B |
| Example 36 | acetone | 0.3 | myrcene | 200 | 4 | 6.7 | B |
| Example 37 | acetone | 2.5 | sorbic acid | 200 | 4 | 6.7 | B |
| Example 38 | acetone | 18 | sorbic acid | 200 | 4 | 6.7 | B |
| Example 39 | acetone | 0.08 | sorbic acid | 200 | 4 | 6.7 | C |
| Example 40 | acetone | 90 | sorbic acid | 50 | 4 | 6.7 | C |
| Example 41 | methyl ethyl ketone | 35 | sorbic acid | 200 | 4 | 6.7 | C |
| Example 42 | 2-hexanone | 35 | sorbic acid | 200 | 4 | 6.7 | C |
| Comparative Example 7 | acetone | N.D. *[1] | sorbic acid | 1,000 | 4 | 6.7 | D |
| Comparative Example 8 | acetone | 500 | sorbic acid | 200 | 4 | 6.7 | D |
| Comparative Example 9 | acetone | N.D. *[1] | sorbic acid | 6,000 | 4 | 6.7 | D |

|  | Evaluations | | | | | | | |
|---|---|---|---|---|---|---|---|---|
|  | appearance of solution | | motor torque fluctuation | appearance characteristics | | impact resistance | | |
|  | transparency | coloring | | streak | coloring | 20 min | 40 min | 10 hours |
| Example 29 | A | B | A | B | B | A | B | B |
| Example 30 | A | A | A | A | A | A | A | A |
| Example 31 | A | B | B | B | B | A | B | B |
| Example 32 | A | B | B | A | A | A | A | B |
| Example 33 | A | B | B | A | A | A | A | A |
| Example 34 | A | B | B | B | B | B | B | B |
| Example 35 | A | A | A | A | A | A | A | A |
| Example 36 | A | B | B | A | A | A | A | B |
| Example 37 | A | A | A | A | A | A | A | A |
| Example 38 | A | B | A | A | A | A | A | A |
| Example 39 | A | B | A | B | B | A | B | B |
| Example 40 | A | A | A | A | A | A | A | A |
| Example 41 | A | B | B | A | B | A | B | B |

TABLE 3-continued

| | | | | | | | | |
|---|---|---|---|---|---|---|---|---|
| Example 42 | A | B | B | A | B | A | B | B |
| Comparative Example 7 | C | C | C | B | B | B | C | C |
| Comparative Example 8 | C | C | C | C | C | C | C | C |
| Comparative Example 9 | C | C | C | C | C | C | C | C |

N.D. *[1]: less than detection lower limit (0.01 ppm)

As shown in Tables 1 to 3, the thermoformed containers of Examples 1 to 42 exhibited more inhibited the coloring and the generation of the streaks, and more superior appearance characteristics, as compared with the thermoformed containers of Comparative Examples 1 to 9. Moreover, the thermoformed containers of Examples 1 to 42 exhibited superior impact resistance even when the thermoformed containers were molded after 20 min from the starting of the coextrusion molding apparatus. It was found that due to the use of the EVOH-containing resin composition that was superior in self-purge feature, the thermoformed containers of Examples 1 to 42 exhibited inhibited occurrence of gelation and the like which would deteriorate the impact resistance within a short time period from the starting of the coextrusion molding apparatus.

INDUSTRIAL APPLICABILITY

The thermoformed container according to the embodiment of the present invention exhibits superior appearance characteristics since the coloring and the generation of defects such as gelation and streaks which are caused on melt molding are inhibited due to the EVOH layer (A) containing the specified amount of the carbonyl compound (II). Additionally, the thermoformed container has sufficient strength. Furthermore, since the EVOH layer (A) contains the specified amount of the carbonyl compound (II), the thermoformed container also exhibits a superior self-purge feature in a production process, thereby enabling a reduction of the production cost of the thermoformed container. Thus, the thermoformed container can be used in a variety of intended usages. According to the production method of the embodiment of the present invention, the oxidization of the EVOH is inhibited, and superior long-run workability (viscosity stability) is exhibited since the resin composition containing the specified amount of the carbonyl compound (II) is used.

EXPLANATION OF THE REFERENCE SYMBOLS

1 cup-shaped container
10 cup main body
10A EVOH layer (A)
10B thermoplastic resin layer (B)
10C polyolefin layer (C)
10D recovery layer (D)
11 flange portion
12 opening
13 inner surface
14 outer surface
2 lid
3 continuous multilayer structure
4 heating apparatus
40, 41 heater
5 die apparatus
50 lower mold half
51 upper mold half
52 recessed part
53 plug

The invention claimed is:

1. A heat-molded container that comprises an EVOH layer (A) comprising an ethylene-vinyl alcohol copolymer (I) as a principal component,
wherein
the EVOH layer (A) comprises a carbonyl compound (II), wherein
the carbonyl compound (II) is an unsaturated aldehyde (II-1), a saturated aldehyde (II-2), a saturated ketone (II-3) or a combination thereof, and
a content of the carbonyl compound (II) in the EVOH layer (A) is 0.01 ppm to 100 ppm.

2. The heat-molded container according to claim 1, wherein the carbonyl compound (II) is the unsaturated aldehyde (II-1), and the unsaturated aldehyde (II-1) is an unsaturated aliphatic aldehyde.

3. The heat-molded container according to claim 2, wherein the unsaturated aliphatic aldehyde is crotonaldehyde, 2,4-hexadienal, 2,4,6-octatrienal or a combination thereof.

4. The heat-molded container according to claim 1, wherein the carbonyl compound (II) is the saturated aldehyde (II-2), and the saturated aldehyde (II-2) is propanal, butanal, hexanal or a combination thereof.

5. The heat-molded container according to claim 1, wherein the carbonyl compound (II) is the saturated ketone (II-3), and the saturated ketone (II-3) is acetone, methyl ethyl ketone, 2-hexanone or a combination thereof.

6. The heat-molded container according to claim 1, wherein the EVOH layer (A) further comprises a conjugated polyene compound (III), and
a content of the conjugated polyene compound (III) in the EVOH layer (A) is 0.01 ppm to 1,000 ppm.

7. The heat-molded container according to claim 6, wherein the conjugated polyene compound (III) is sorbic acid, a sorbic acid salt or a combination thereof.

8. The heat-molded container according to claim 1, wherein
the carbonyl compound (II) is the unsaturated aldehyde (II-1),
the unsaturated aldehyde (II-1) is an unsaturated aliphatic aldehyde,
the unsaturated aliphatic aldehyde is crotonaldehyde, 2,4-hexadienal, 2,4,6-octatrienal or a combination thereof,
the EVOH layer (A) further comprises a conjugated polyene compound (III), and
a content of the conjugated polyene compound (III) in the EVOH layer (A) is 0.01 ppm to 1,000 ppm.

9. The heat-molded container according to claim 1, wherein
the carbonyl compound (II) is the saturated aldehyde (II-2), the saturated aldehyde (II-2) is propanal, butanal, hexanal or a combination thereof, the EVOH layer (A) further comprises a conjugated polyene compound (III), and a content of the conjugated polyene compound (III) in the EVOH layer (A) is 0.01 ppm to 1,000 ppm.

10. The heat-molded container according to claim 1, wherein the carbonyl compound (II) is the saturated ketone (II-3), the saturated ketone (II-3) is acetone, methyl ethyl ketone, 2-hexanone or a combination thereof, the EVOH layer (A) further comprises a conjugated polyene compound (III), and a content of the conjugated polyene compound (III) in the EVOH layer (A) is 0.01 ppm to 1,000 ppm.

11. The heat-molded container according to claim 1, further comprising:

thermoplastic resin layers (B) each laminated on one face side and another face side of the EVOH layer (A); and a polyolefin layer (C) arranged between the EVOH layer (A) and the thermoplastic resin layer (B) and comprising a carboxylic acid-modified polyolefin as a principal component, wherein a solubility parameter of the thermoplastic resin constituting the thermoplastic resin layer (B) calculated using a Fedors equation is 11 $(cal/cm^3)^{1/2}$ or less.

12. The heat-molded container according to claim 1, which is a cup-shaped container.

13. The heat-molded container according to claim 1, which is a tray-shaped container.

14. A method for producing the heat-molded container according to claim 1, the method comprising:

forming an EVOH layer (A) with a resin composition comprising an ethylene-vinyl alcohol copolymer (I) as a principal component and comprising the carbonyl compound (II); and subjecting a layer comprising the EVOH layer (A) to heat molding, wherein the carbonyl compound (II) is an unsaturated aldehyde (II-1), a saturated aldehyde (II-2), a saturated ketone (II-3) or a combination thereof, and a content of the carbonyl compound (II) in the resin composition is 0.01 ppm to 100 ppm.

* * * * *